June 10, 1941. J. D. NIXON 2,245,003
MEANS FOR LIFTING FLUIDS FROM WELLS
Filed Feb. 3, 1940 13 Sheets-Sheet 1

Inventor
Jeddy D. Nixon
By Jack R. Ashley, Jr.
Attorney

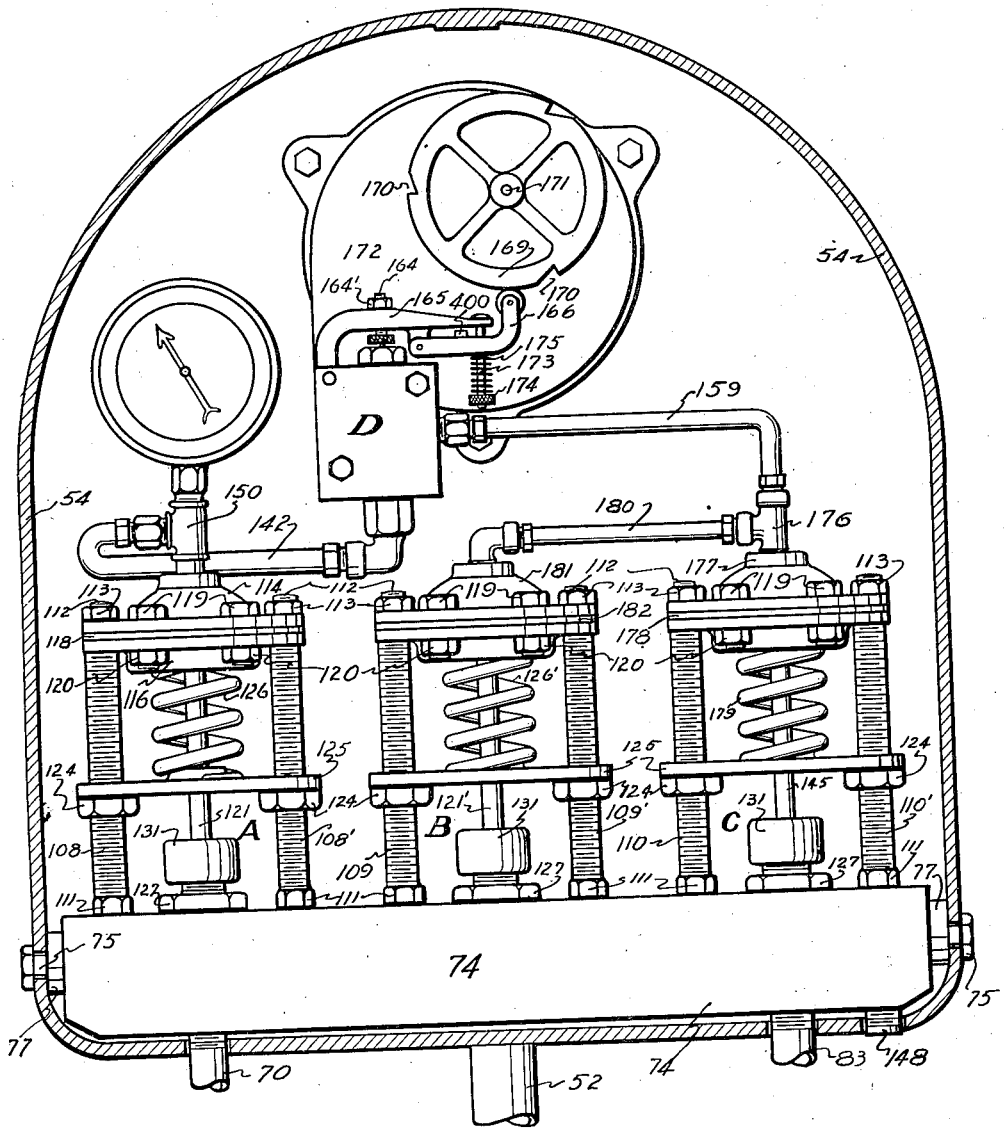
Fig. 4
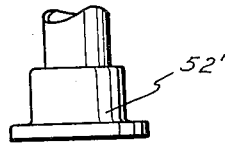

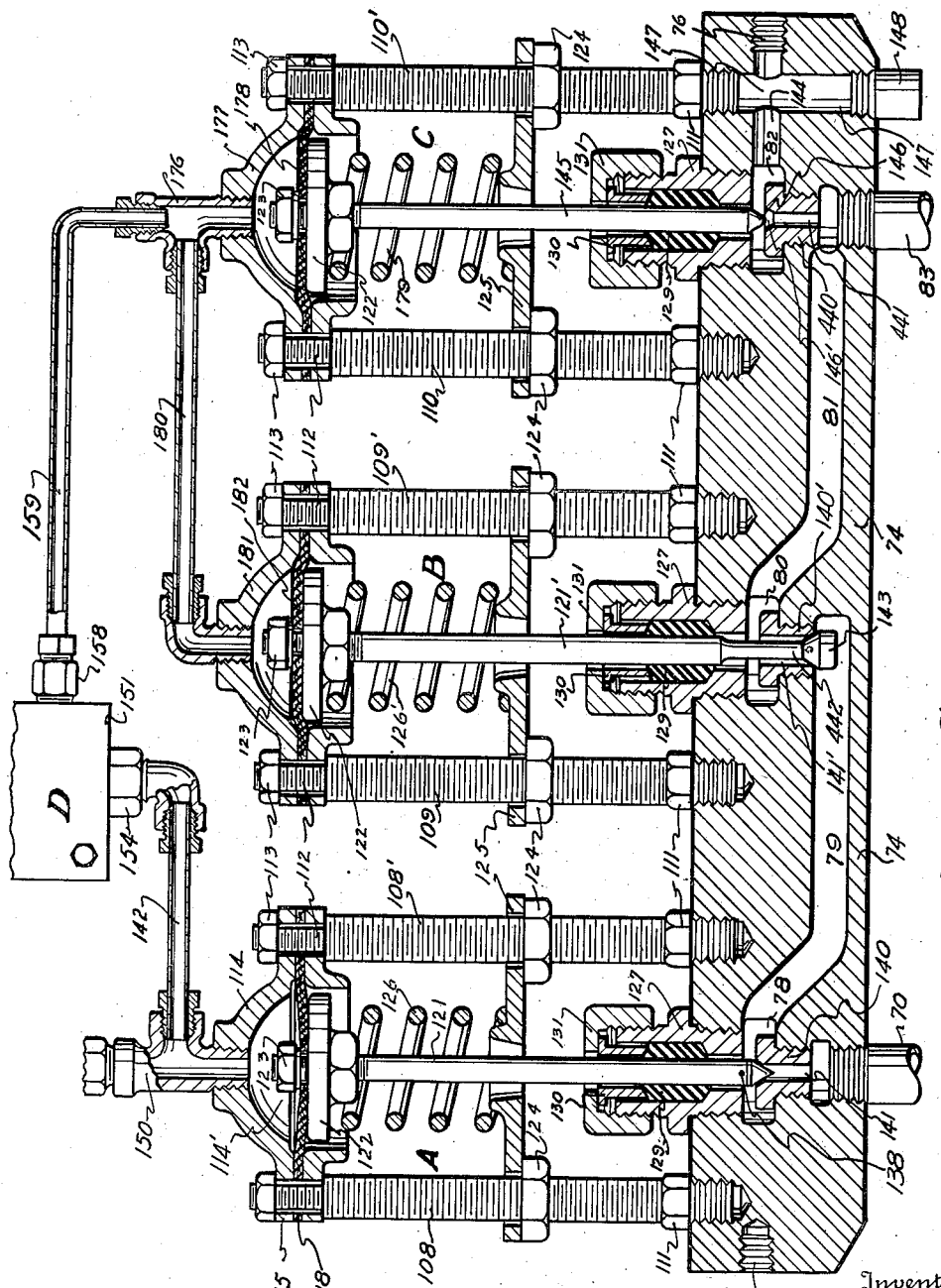

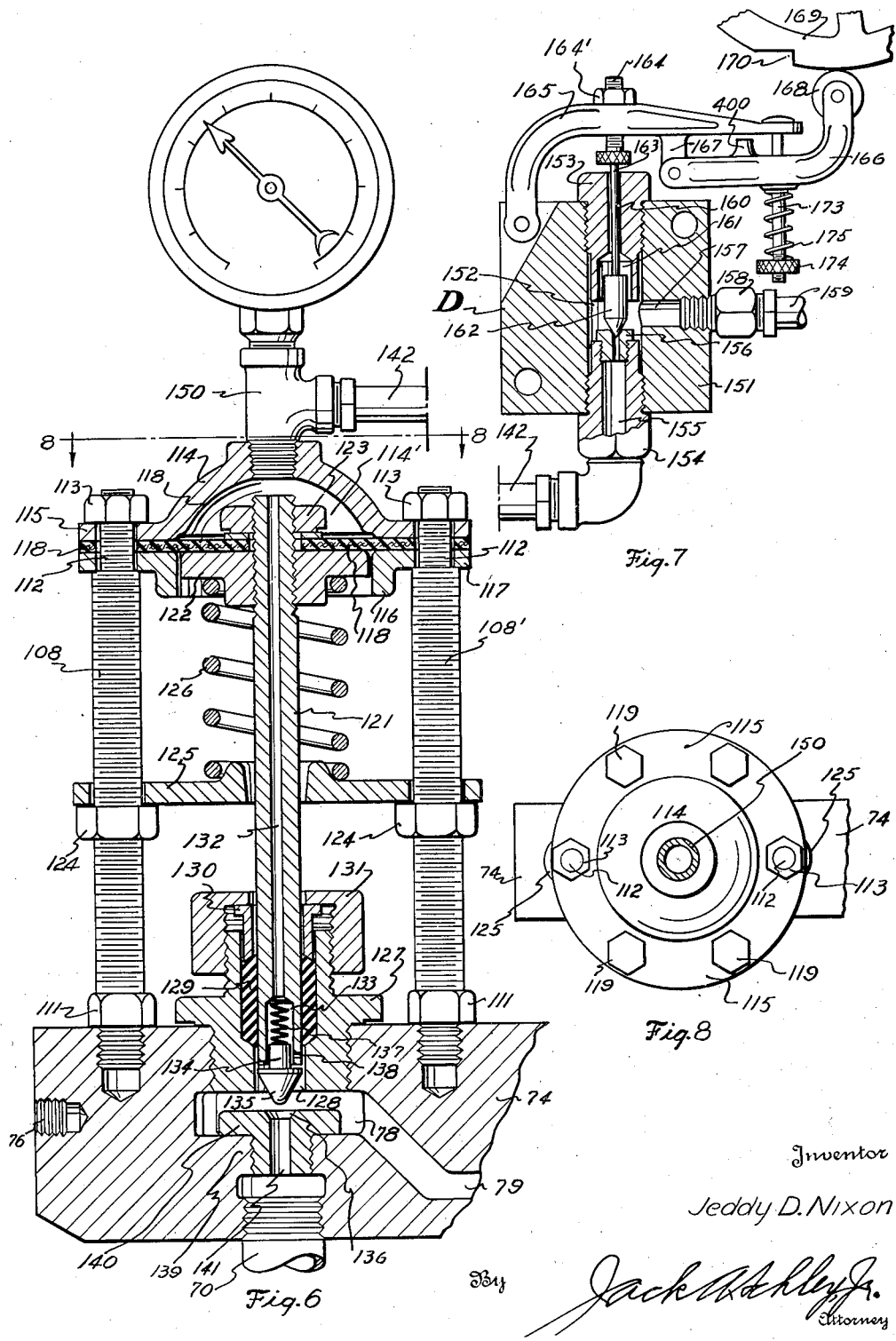

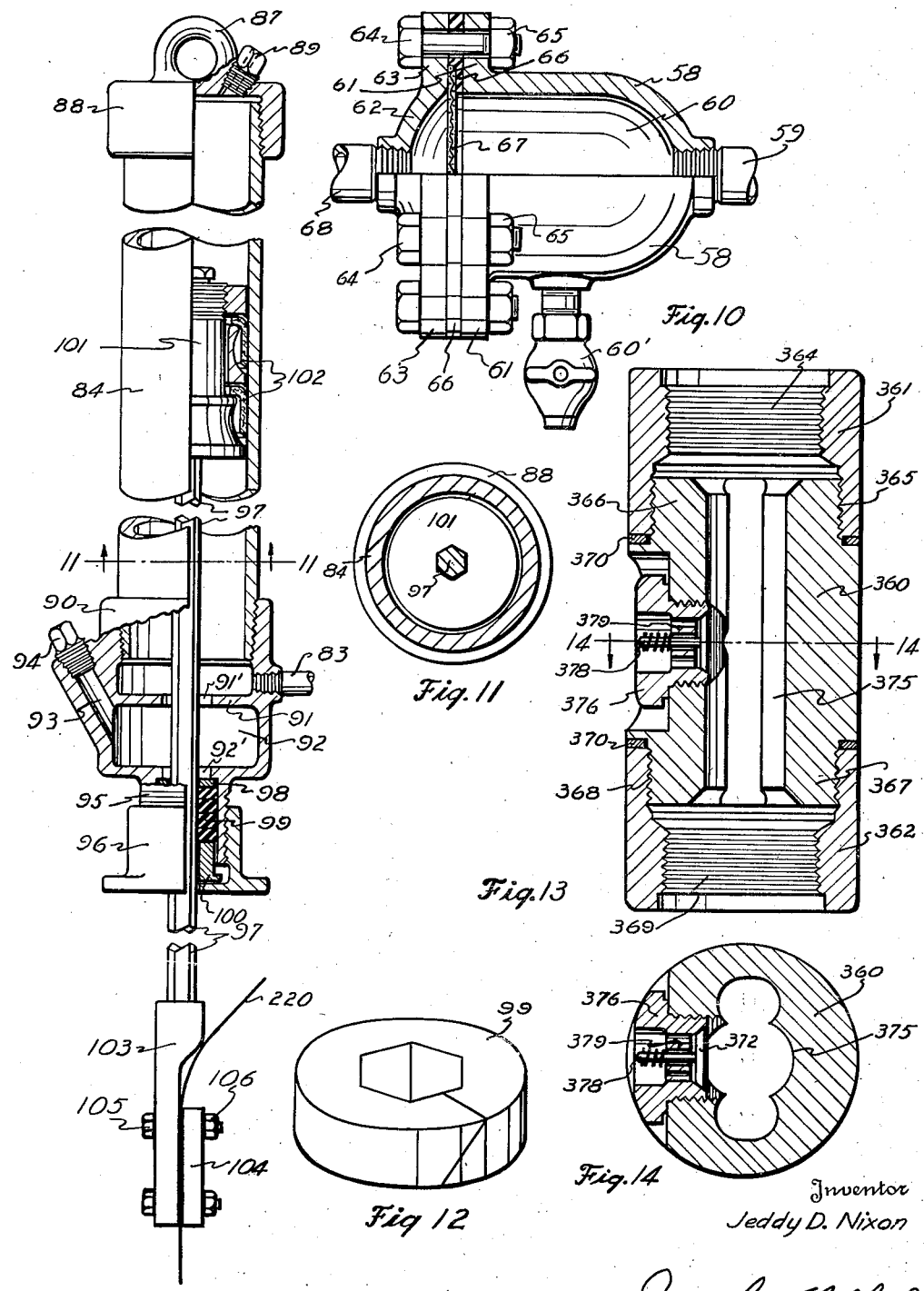

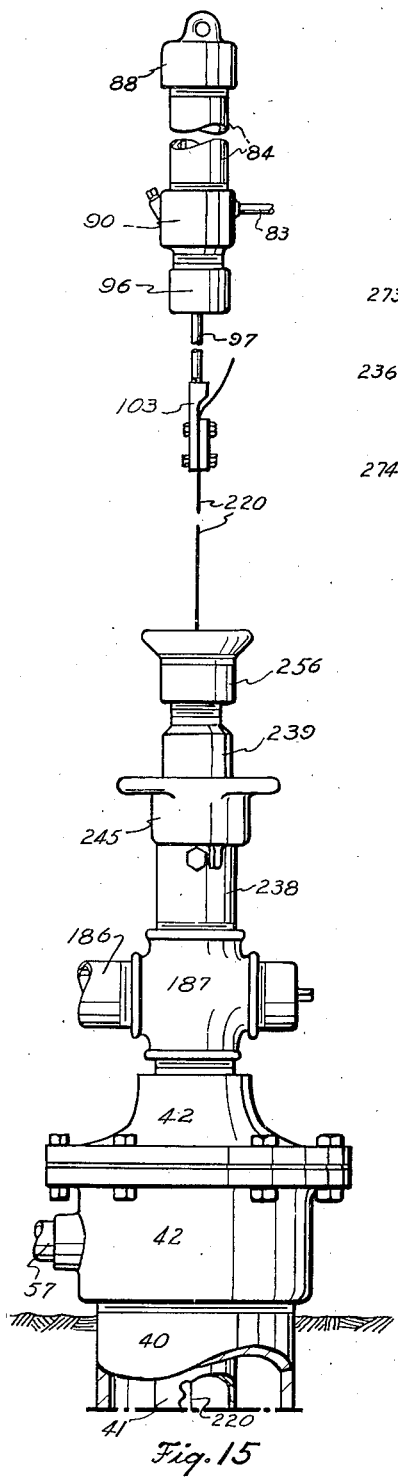

Inventor
Jeddy D. Nixon
By Jack Atchley, Jr.
Attorney

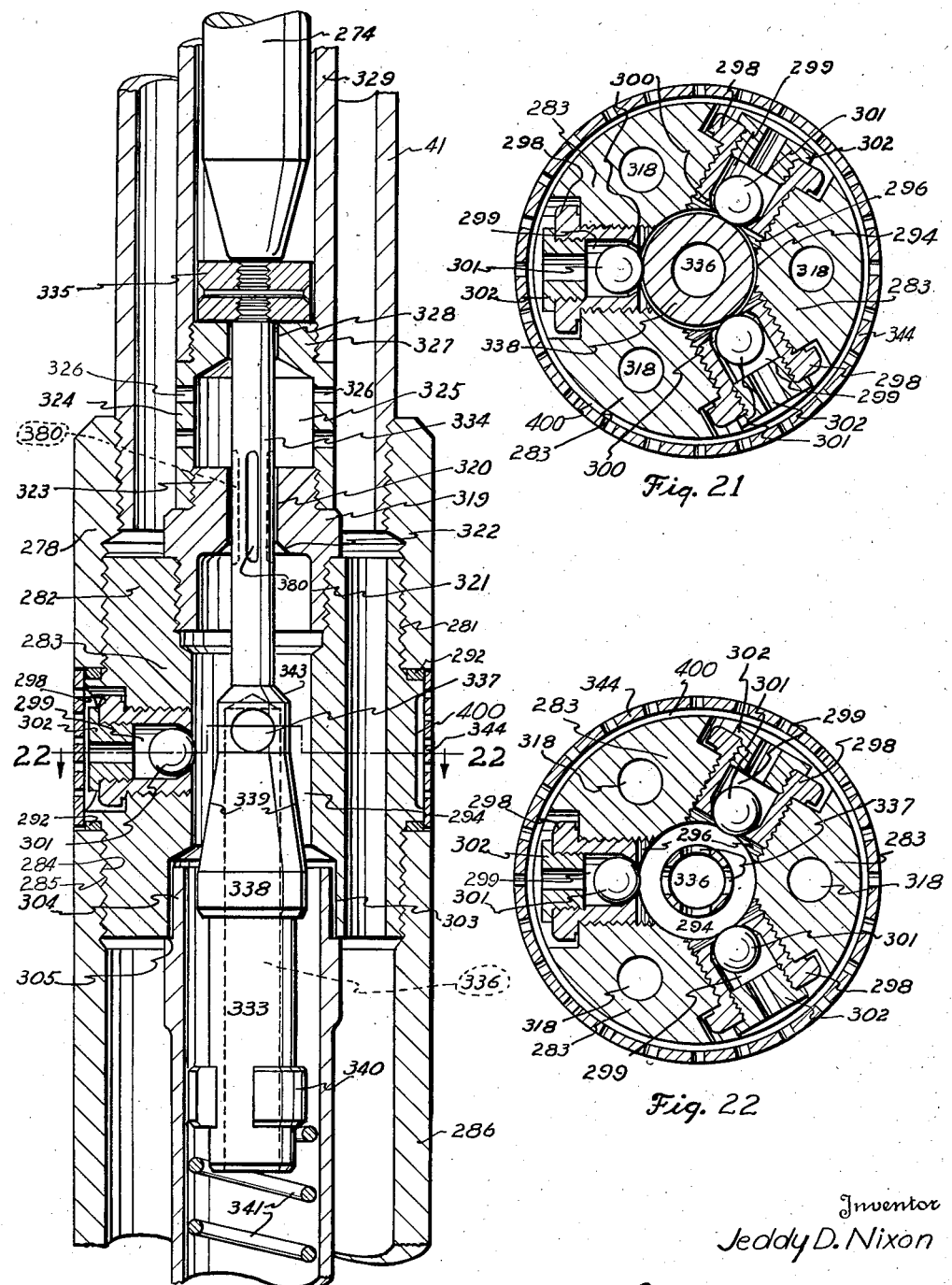

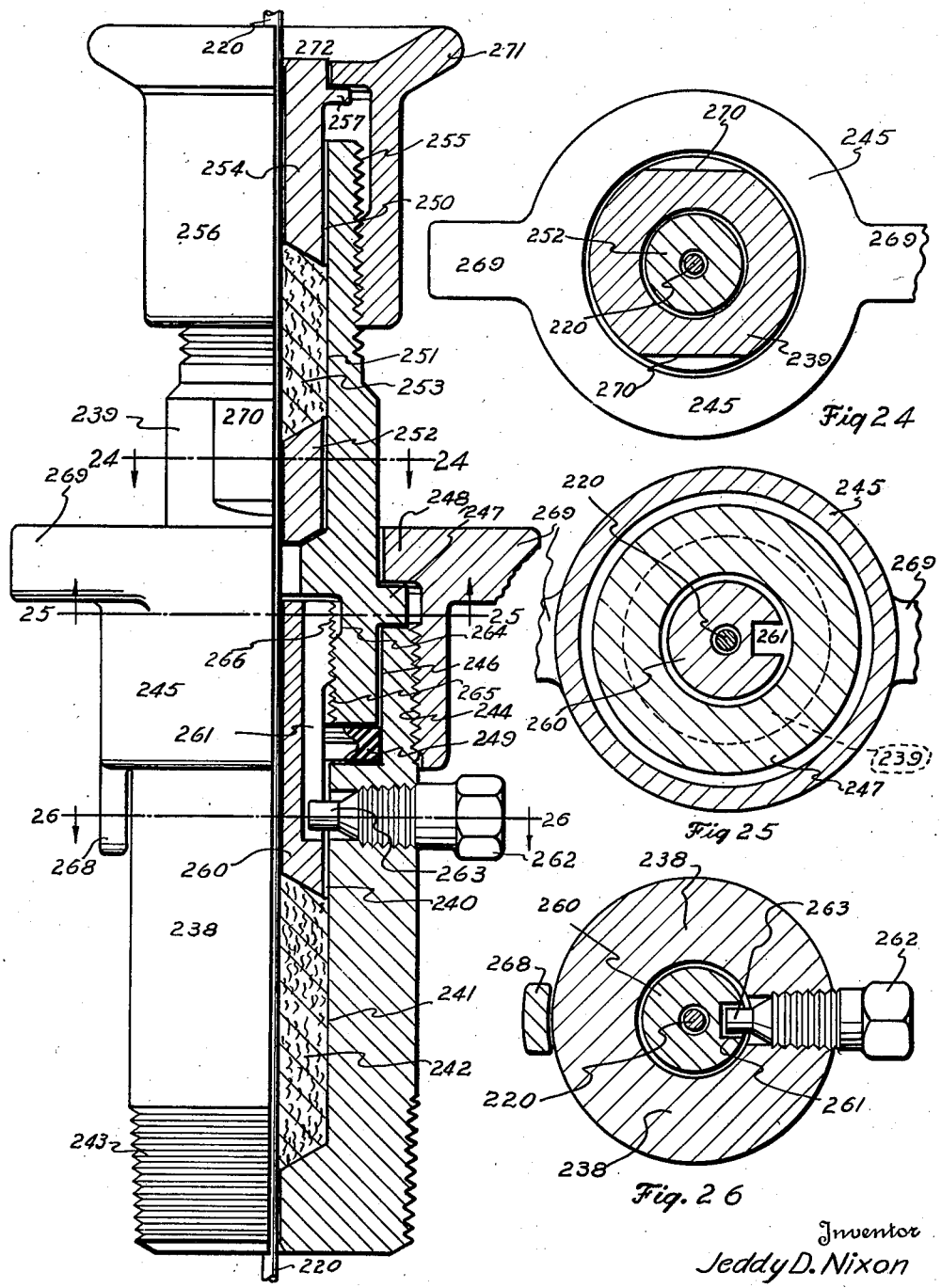

June 10, 1941.                J. D. NIXON                2,245,003
                    MEANS FOR LIFTING FLUIDS FROM WELLS
                Filed Feb. 3, 1940           13 Sheets-Sheet 12

Inventor
Jeddy D. Nixon

By Jack Ashley Jr.
Attorney

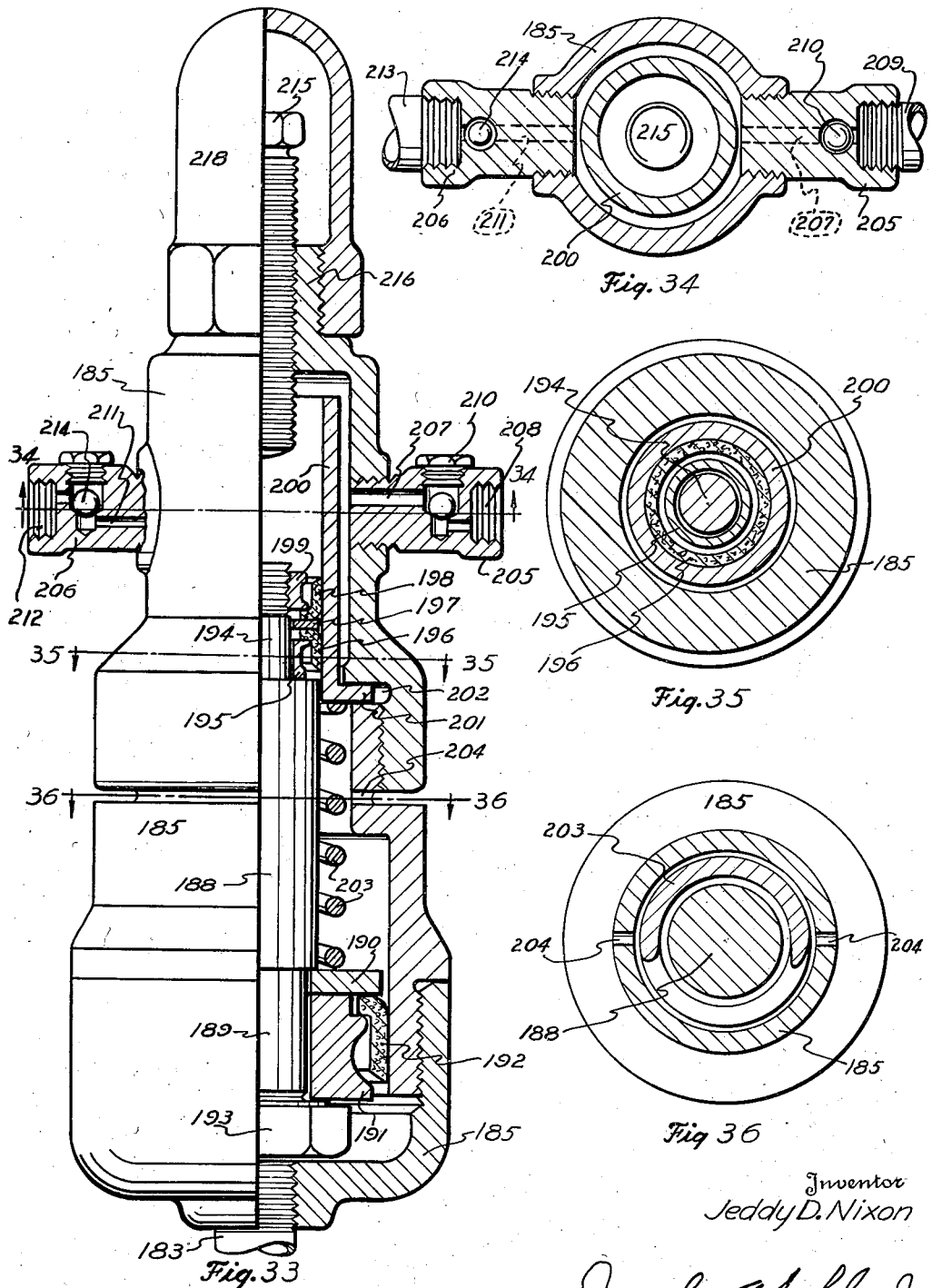

Patented June 10, 1941

2,245,003

UNITED STATES PATENT OFFICE 2,245,003

MEANS FOR LIFTING FLUIDS FROM WELLS

Jeddy D. Nixon, Houston, Tex., assignor of one-half to Wilson Supply Company, Houston, Tex., a corporation of Texas Application February 3, 1940, Serial No. 317,073

3 Claims. (Cl. 103—232)

This invention relates to new and useful improvements in means for lifting fluids from wells.

One object of the invention is to provide certain improvements in well fluid lifting systems and apparatuses and particularly upon my Patents No. 2,164,469, No. 2,171,478, No. 2,171,479, No. 2,171,480, No. 2,171,812, and Reissue Patent No. 21,199; and my co-pending applications, Serial No. 239,348, filed November 7, 1938; Serial No. 286,683, filed July 26, 1939; and Serial No. 304,684, filed November 16, 1939.

Another object of the invention is to provide improved means for controlling the admission of a lifting fluid under pressure to a well pipe to lift the well fluid therein; whether the source of lifting fluid is from the well proper or from a supply outside of the well.

A further object of the invention is to provide an improved system of controlling the lifting of the well fluid from the producing level to the surface which consists in, a supply of pressure fluid, means for conducting a portion of the pressure fluid to the well fluid to lift the same, means operated from the surface for controlling the point of introduction of said conducted portion of pressure fluid to said well fluid, and means on the surface for regulating the operation of the control means for controlling the introduction of the conducted portion of pressure fluid to said well fluid.

An important object of the invention is to provide an improved device so arranged that all of the control mechanism on the surface is unitized and may be mounted on skids so as to be readily transportable and to make for ease in installing on location.

Still another object of the invention is to provide an improved surface actuating assembly including an improved mast and wherein the various instrumentalities may be grouped as a unit, thus making a compact arrangement which may be readily assembled.

Still another object of the invention is to provide an improved device for use with said invention which is so constructed as to extract and trap all foreign matter from the pressure fluid used in all of the control mechanism mounted on the surface of the well, whereby the clogging or interference with the actuation of said mechanism is prevented.

Still another object of the invention is to provide a pressure fluid-driven hoist for the line used in said well which is compact and relatively light so as to be easily portable and which is so arranged that all of the operating controls therefor are within easy reach of an operator, whereby the positive control of said line is had at all times.

A construction designed to carry out the invention will be hereinafter described, together with other features and objects of the invention.

The invention will be more readily understood from the following specification and by reference to the accompanying drawings, in which an example of the invention is shown, and wherein:

Figure 4 is a view partly in section and partly in elevation of the intermittent control mechanism and its housing;

Figure 5 is a longitudinal, cross-sectional view of a portion of the operating mechanism of the intermittent control mechanism;

Figure 6 is a view partly in section and partly in elevation of the regulator valve of said mechanism;

Figure 7 is a detail view of the time-controlled valve for regulating the actuation of said mechanism;

Figure 8 is a plan view of said regulator valve;

Figure 9 is a view partly in section and partly in elevation of the actuating cylinder of said invention;

Figure 10 is a view partly in section and partly in elevation of a strainer used with said invention;

Figure 11 is a horizontal, cross-sectional view taken on line 11—11 of Figure 9;

Figure 12 is an isometric view of one of the packing rings used in the lower end of said operating cylinder;

Figure 13 is a longitudinal sectional view of a valve constructed to prevent the accumulation of formation or free well gas in said casing below said packer;

Figure 14 is a horizontal, cross-sectional view taken on line 14—14 of Figure 13;

Figure 15 is an elevation of the upper end of a well and the casing and tubing therefor, together with the casing head and stuffing box arrangement.

Figure 16 is a view partly in section and partly in elevation showing the intermediate portion of a well and is a continuation of Figure 15;

Figure 17 is a similar view showing the lower portion of a well and is a continuation of Figure 16;

Figure 20 is a longitudinal, sectional view of a portion of said valve showing it in its closed position;

Figure 21 is a horizontal, cross-sectional view taken on the line 21—21 of Figure 19, showing said valve in its open position;

Figure 22 is a similar view taken on the line 22—22 of Figure 20, showing said valve in its closed position;

Figure 23 is an enlarged view, partly in section and partly in elevation, of one form of a wire line stuffing box which may be used on the upper end of said tubing;

Figure 24 is a horizontal, cross-sectional view taken on the line 24—24 of Figure 23;

Figure 25 is a similar view taken on the line 25—25 of Figure 23;

Figure 26 is a horizontal, cross-sectional view taken on the line 26—26 of Figure 23;

Figure 33 is a detailed view, partly in section and partly in elevation, of an injector or lubricator which may be used with the invention to introduce a chemical or fluid into the well fluid flow line;

Figure 34 is a horizontal, cross-sectional view taken on the line 34—34 of Figure 33;

Figure 35 is a similar view taken on the line 35—35 of Figure 33; and

Figure 36 is a horizontal, cross-sectional view taken on the line 36—36 of Figure 33.

Figure 1:
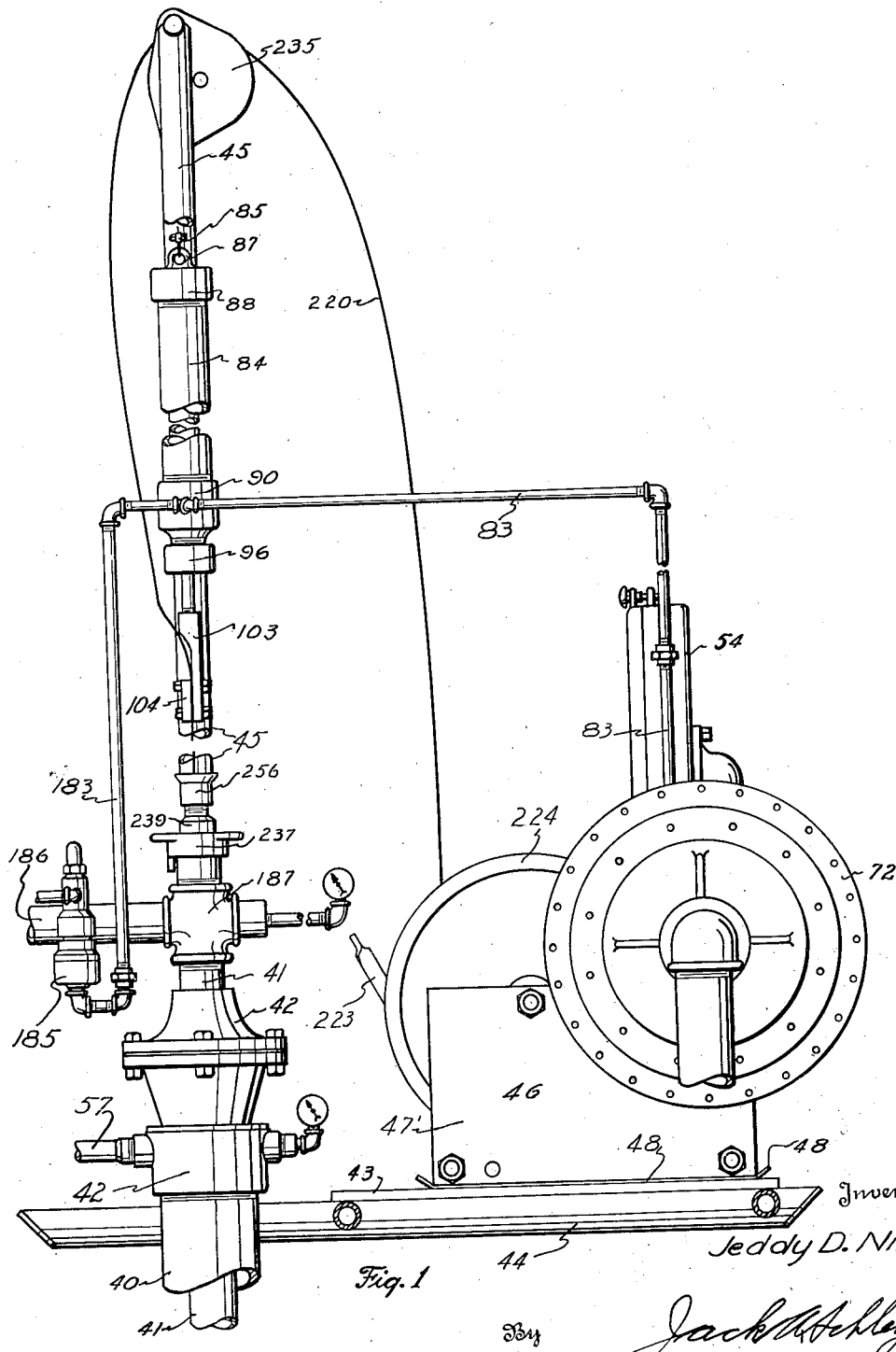
Figure 1 is a side elevation of the above-ground structure, constructed in accordance with the invention and having one of the skid members of the unitized base removed.

In the drawings, the numeral 40 designates the usual well casing (Figures 1, 15, 16, 17 and 18) which has a well tubing string 41 depending axially therethrough. The upper end of the casing is screwed into the usual casing head 42, mounted above the ground level, and the upper end of the tubing string is supported within the casing head in the regular manner. All of the above-ground structure may be substantially the same as that set forth in my above-mentioned patents and copending applications, but I prefer to use the arrangement and structures shown in the drawings (Figures 1, 2, 3 and 15).

A suitable platform or base 43 is mounted on skids 44, preferably being constructed of tubing or pipe. A suitable stub derrick or mast 45 is mounted on the skids 44 and spaced from said platform 43 (Figures 1 and 3). This stub derrick is also preferably constructed of tubing or pipe, but said derrick, said skids 44 and all cross bracing may be of any suitable material and construction desired. It will be noticed in Figures 1, 2 and 3, that said platform, skids and derrick are provided for supporting and carrying the above-ground equipment used with this invention, as will be more fully hereinafter set forth.

The platform 43 forms a support for a hoist 46 to be mounted thereon and preferably attached thereto in any suitable manner. The framework or support of this hoist consists of side or end plates 47 and 47' mounted upon skids or foot pieces 48 which are upturned in the usual manner on each end. These side plates are held together in a spaced relation by elongated bolts 49 having reduced threaded pins on their outer ends and nuts 50 are screwed thereon to clamp said side plates to said bolts. On the upper edge of said plates 47 and 47', a suitable cross bar 51 is attached for supporting an upright pipe or support 52 by a flanged collar 52' being threaded onto the lower end of said pipe. The upper end of said pipe engages within a suitable bracket 53 mounted on the back and near the lower edge of a suitable housing 54. This housing comprises a water-tight, dust-proof enclosure for the intermittent control mechanism. This mechanism controls the flow of a pressure fluid to a suitable operating mechanism which will be more fully hereinafter described.

This pressure fluid is supplied to the well and said controlling mechanism in said housing 54 by a suitable field line 55 which terminates in a T 56. A pipe 57 is connected to one leg of said T and leads to one of the outlet openings of said casing head 42, so that said pressure fluid will be introduced into said well casing 40 outside of said tubing 41. The other leg of said T 56 is connected to a strainer housing 58 (Figures 1, 2 and 10) by a short nipple 59.

This housing contains an enlarged chamber 60 and is provided externally with an annular flange 61. An annular, concavo-convex cap or head 62 abuts the open end of said housing and this cap is also provided with an annular flange 63 corresponding to the flange 61. The flanges 61 and 63 are held together by bolts 64 and nuts 65 and clamped between said flanges is a gasket 66 of rubber, rubber compound, or any suitable material. Attention is called to Figure 10, in which it will be seen that a circular filter screen or disk 67 is clamped between said gasket ring 66 and said cap 62, so that the outer edge or perimeter of said disk terminates short of said bolts 64, whereby said pressure fluid entering said housing 58 through said nipple 59, has to pass through said filter screen 67, into said cap 62 and out through said pipe 68 to a T 69. A suitable pet cock 60' is connected to said chamber 60 to drain the same.

A pipe 70 is connected to one leg of said T 69 which extends to said housing 54 (Figures 2, 3 and 4) and the other leg of said T has a pipe 71 connected thereto, that extends to a pressure fluid turbine housing 72 mounted on the upper edge of one of said side plates 47'. This pipe 71 has a manually operated, throttle valve 73 connected therein, in order to control the feed of pressure fluid to said turbine (not shown) which regulates the speed and the running of said turbine within said housing 72, as will be more fully hereinafterwards described.

As will be seen in Figure 4, an elongate, rectangular body 74 is mounted in the lower portion of said housing 54 and is suitably fastened to said housing by one or more stud bolts 75 engaging in threaded sockets 76 in each end of said body. This body is spaced from and held rigid in said housing 54 by flat washers 77 surrounding said bolts 75. The purpose, function and operation of the intermittent control mechanism positioned within said housing 54 and mounted upon and within said body 74 is very similar to the intermittent control mechanism shown in my Patent No. 2,171,478, and while the mechanism shown in this patent may be used just as satisfactorily with this invention, in some instances on certain type of wells, I prefer to use the structure shown and described for Figures 4, 5, 6, 7 and 8.

The pressure fluid supply pipe 70 is threadably connected into the lower end of a vertical port or passageway 78 extending transversely through said body 74 from its lower edge to its upper edge. This port 78 is connected to one end of an elongate, horizontally extending passageway 79 lying longitudinally of said body 74 and which terminates in a vertical port or passageway 80, similar to said port 78. This port 80 extends from the upper edge of said body 74 to the bottom of said passageway 79, but does not extend therebelow as does said port 78. One end of an elongated, horizontally extending passageway 81, similar to the passageway 79, is connected to said vertical port 80 intermediate its ends and above where said passageway 79 terminates in said port 80, so that said port extends transversely of said passageways 79 and 81 and forms a communication therebetween. The other end of said passageway 81 terminates in a vertical, transverse port or passageway 82, similar to said port 78. The lower edge of said vertical port 82 has a pipe 83 threadably connected therein, the same as said pipe 70 in said vertical port 78. This pipe 83 extends out of said housing 54 (Figures 2 and 4) to the lower end of an elongate, tubular housing or cylinder 84 of an actuating mechanism, as will be seen in Figures 1, 2, 3, 9 and 15.

This cylinder is suitably suspended over the well, as by a short length of wire or rope 85 fastened to a cross bar 86 at the upper end of said stub derrick 45 and the other end of said rope being secured to an upright ear 87 formed on the upper end of a cap 88 threadably mounted on the upper end of said cylinder 84. If the usual drilling derrick (not shown) is used or another type of stub derrick, said cylinder and rope 85 may be suspended from the usual crown block of said derricks, or in any other manner desired. The cap 88 is provided with a small, vent plug or bolt 89 threaded thereinto on its upper end adjacent said ear 87 and this plug is formed with an axial opening therethrough for providing the usual air vent for said cap and the upper portion of said cylinder 84 (Figure 9).

The lower end of said cylinder is closed by an elongated, annular body or head 90 and it will be seen in Figure 9, that said pipe 83 extending from said port 82 of said valve body member 74 within said housing 54 is threadably connected into said body 90. The annular space within said body 90 is divided into two separate chambers by a transverse, horizontal partition 91, whereby a chamber 92 is formed therebelow for containing a suitable lubricant, such as lubricating oil. A filler port and passageway 93 is provided for said chamber, preferably terminating adjacent the lower edge of said partition 91 and extending diagonally upwardly to make for ease in filling said chamber 92 with said lubricant. A plug or cap 94 is of course provided for the passageway 93, in order to prevent dirt and extraneous matter from entering said chamber. The lower end of said body 90 is formed with a depending, annular nipple or skirt 95 which is externally screw-threaded, so as to receive an internally screw-threaded thimble or cap 96.

It is pointed out in Figure 9, that the partition 91 and the bottom of said cap 90 are provided with co-axial openings 91' and 92' respectively, and that said nipple 95 is formed with a packing chamber which is co-axial with said openings 91' and 92', in order that an elongate, hexagonal piston rod 97 may depend axially from within said cylinder 84 and through said cap 90 and out from said thimble 96. In loading the packing chamber of said nipple 95, a suitable washer or junk ring 98 is first placed around said rod 97 and then slid within said nipple, which is followed by a plurality of suitable split packing rings 99 having co-axial, hexagonal openings or bores therethrough. The usual follower block 100 bears against the outermost ring in the regular manner for compressing said packing rings into a tight, sliding engagement with said piston rod 97. Thus, when said packing has been tightened as explained, the lubricant in the chamber 92 will be held there and prevented from escaping down said rod 97.

The upper end of said piston rod is provided with a suitable piston 101 having the usual sealing and packing rings or cups 102 mounted thereon. The lower end of said piston rod is screwed into the upper end of an elongated, wire line clamp 103 (Figure 9). The lower portion of the clamp is cut back and provided with an axial groove (not shown), in order that one side of a wire line 220 may be embedded therein and clamped thereto by a clamping block or member 104 held to said clamp by bolts 105 and nuts 106. This block 104 may be similarly grooved the same as said clamp 103, as has been fully and completely set forth in my above-mentioned patents and co-pending applications. It is pointed out that whenever said piston rod 97, piston 101 and clamp 103 are moved and the wire line 220 is fastened in said clamp, said wire line will be moved with said piston rod 97.

In Figures 4 and 5, it will be seen that said said valve body member 74 in the lower end of said housing 54, has screwed into its upper side three pairs of upright, externally screw-threaded stud bolts or posts 108, 108'; 109, 109'; and 110, 110'. The threaded bolts comprising each pair of posts are spaced equidistant from their respective vertical ports 78, 80 and 82; such as said posts 108 and 108' from said port 78, said posts 109 and 109' from said port 80, and said bolts 110 and 110' from said port 82. All of said posts are secured to said body member by a lock or retaining nut 111 on the foot of each post being tightened on the external threads of said posts against the upper surface of said body. Each pair of posts and the respective port therewith (Figures 4, 5 and 6) constitute a separate valve in function and purpose, and while all three are similar in construction, I will describe only one valve in detail (Figure 6), which description will suffice for all.

The upper end of said posts 108 and 108' are formed with upright, co-axial, reduced pins 112 having external screw-threads thereon. A diaphragm cap and piston chamber structure is mounted upon the upper end of said threaded posts 108 and 108' and aligned with said vertical port 78. This diaphragm and piston structure is very similar to that shown and used in my other form of intermitters, such as my Patent No. 2,171,812 and Patent No. 2,171,478, and my co-pending application, Serial No. 239,348.

This structure consists of a concavo-convex, annular cap or head 114 having an outwardly directed flange 115 on its perimeter. The annular piston chamber or cylinder 116 has a similar flange 117 and these two flanges 115 and 117 are clamped together by a plurality of bolts 119 and nuts 120 for gripping and clamping a diaphragm disk 118 therebetween. It is pointed out that a diaphragm actuating chamber 114' is formed above said diaphragm within said cap 114. The diaphragm is provided with an axial opening so that the upper end of a piston rod 121 may extend therethrough, in order that said diaphragm and a flat, circular piston 122 may be securely connected together by a nut 123 engaging said threaded upper end of said piston rod on the upper side of said diaphragm; whereby said diaphragm 118, said piston 122 and said piston rod 121 are tied together and moved as a unitary structure.

It will be noticed in Figure 6, that intermediate the ends of said threaded bolts 108 and 108', an adjusting nut 124 is mounted on each bolt and these nuts support an oblong web 125, whereby upon the rotation of said nuts 124, said web may be raised or lowered as desired. A suitable coil spring 126 is interposed between and bears against the upper surface of said web 125 and the lower surface of the piston 122, whereby an upward tension or thrust is placed or exerted upon said piston 122, said piston rod 121 and said diaphragm 118. Thus, it will be seen that by adjusting said nuts 124, this tension is regulated and may be increased or decreased as is needed.

The lower end of said piston rod 121 depends within said vertical port 78 and a suitable stuffing box is provided for closing the upper end of said port 78 and packing around the lower end of said piston rod 121. This stuffing box may comprise a threaded nipple 127 having an axial opening 128 therethrough, the upper portion of which is counterbored to provide a packing area or chamber for a suitable packing 129. The usual follower block 130 rides upon the packing 129 and is engaged and actuated by a threaded cap 131 screwed upon the upper end of said nipple 127.

It will be seen in Figures 7 and 8 that said piston rod 121 is provided with an axial bore or passageway 132 extending entirely therethrough, so that fluid may flow through said piston rod from one end to the other. The lower portion of said bore 132 is counterbored at 133 so as to provide an entrance or admission chamber. A small, annular dart or foot piece 134 is positioned at the lower end of said piston rod and has a conical valve tip or face 135 on its lower end and an upstanding, short cylindrical pin on its upper side. This pin has a loose fit within said counterbore 133 and the upper end of said pin abuts the lower edge of a small coil spring 137 which exerts a slight tension downwardly on said dart. A small hole or opening 138 is provided in the wall of said piston rod adjacent the lower end of said piston rod 121 for providing additional communication between said counterbore 133 and the outside of said piston rod. It will be seen that said port 78 is provided with an internal web or partition 139 into which is fitted a replaceable member 140 which has an axial port 141 extending therethrough and the upper end of said port is formed with a ground, tapered seat 136 to receive the conical valve face tip or member 135.

It is pointed out that when pressure fluid enters said valve body member 74 through said vertical port 78 from said pipe 70, said pressure fluid has to flow through the axial port 141 of the replaceable seat member 140, where said pressure fluid will engage and lift said dart 134 against the tension of said spring 137, as well as lifting said piston rod 121. Then said pressure fluid will enter said counterbore 133 both through said hole 138 and around said pin of said dart 134, flowing through said bore 132 of said piston rod and out the upper end thereof on top of said diaphragm 118. While said spring 126 tends to keep said port 141 open, the filling up of said chamber 114' in said cap 114 and a pipe 142 leading therefrom to clock valve D will build up a pressure on said diaphragm which is of sufficient area, whereby said piston rod will be moved downwardly onto its seat 136 to close said port 141, at whatever pressure it is desired to maintain in the cap 114. Of course, the same pressure present in said pipe 142, cap 114, bore 132, port 78 above said partition 139 will also be present in said longitudinal passageway 79 up to the lower end of said vertical port 80.

The valve A is termed and serves the purpose of a regulator valve, because the pressure in said pipe 70 is always greater than that used and desired for operating said actuating mechanism, whereby said pressure fluid is reduced at this point to the pressure desired and a reserve of this pressure fluid is maintained. Upon any withdrawal, this reserve is replenished by a reduction of the pressure in said chamber 114' upon said diaphragm 118, so that said spring 126 will lift said stem 121 and open said port 141. It will be seen that said pipe 142, cap 114, bore 132 and port 78 above said partition 139 and longitudinal passageway 79 are all in communication and form a pressure fluid reservoir; so that upon withdrawal of pressure fluid from said pipe 142 or said passageway 79, the pressure within said chamber 114' of said cap 114 will also be reduced simultaneously, whereby said spring 126 lifts said piston 122, said piston rod 121 and said valve face 135 from said seat 136 for admitting more pressure fluid through said port 141. The pressure in said reservoir is again increased to the point where said diaphragm 118 forces said piston rod 121 downwardly and closes said port 141, whereby a pre-determined pressure may be maintained in said reservoir by adjusting the tension of said spring 126 through the rotation of said nuts 124 on said bolts 108 and 108'.

The valve B is termed and serves the purpose of a motor or gate valve, as it controls the flow of pressure fluid from said passageway 79 through said port 80 into said passageway 81. It will be seen that the structure of valve B is very similar to valve A with the exception that the stem 121' is solid and has a reduced portion 442 on its lower end which terminates in an enlarged foot or valve member 143. The action of valve B is also different in that the port 141' is larger in diameter than said port 141 and is opened upon the downstroke of said piston rod 121' and closed upon the upstroke or travel of said piston rod.

The valve C is termed and serves the purpose of a release or control valve and this valve and port 82 are similar to said valve A and port 78 in structure and action with the exception that the stem 145 is solid and terminates at its lower end in a conical tip or valve member 146 for engaging the valve seat 146' at the upper end of the port 441 of a replaceable seat member 440, similar to said seat member 140. This valve C closes said port 441 upon the downward travel of said piston rod 145 and opens the same upon its upward travel. The upward and downward travel of said piston rod is caused by the accumulation of pressure fluid in the cap 177 acting upon the diaphragm 178 against the tension of said spring 179. When said piston rod 145 is in its upper position as shown in Figure 5, any fluid in said passageway 81 or said pipe 83 will flow through said port 441, into the passageway 144, then into the passageway 147, from which it is led into a short length of pipe 148 where it is vented to the atmosphere. Whenever said valve B is opened, said valve C will be closed, that is said piston rod 145 will be in its lower position and pressure fluid from said passageway 79 entering said passageway 81 will flow into said pipe 83 through which it will be led to the lower end of said cylinder 84 beneath said piston 101, whereby said piston will be lifted or forced to the upper end of said cylinder 84. When said valve B has closed and said valve C is opened, said port 441 is opened so that the pressure fluid in the passageway 81, said pipe 83 and said cylinder 84 beneath said piston 101 will bleed through said port 441 and said passageways 144 and 147 and out of said pipe 148 to the atmosphere, whereby said piston 101 is free to return to the lower end of said cylinder 84.

As has been pointed out, a more or less constant pressure is supplied to said pipe 70 through said strainer 58 from said field line 55 which is connected to a suitable source (not shown). The spring 126 of said regulator valve A is set so as to maintain a pre-determined pressure within said channel or passageway 79, said port 78, said bore 132, said counterbore 133 of said valve stem 121, and said chamber 114' within said cap 114. This same pressure will be present in said T 150 connected to said cap 114, as well as in said pipe 142 leading from said T (Figures 4, 5, 6 and 7) to a clock or time operated valve D.

This valve D is preferably composed of a rectangular block or valve body 151 having a vertical bore 152 therein. This bore extends downward from the top of said block to the bottom thereof and is threaded at each end for receiving a thimble 153 at its upper end and a thimble 154 at its lower end. The thimble 154 connects with said pipe 142 and has an axial bore 155 therethrough, the upper end of which bore is threaded to receive a removable valve seat 156. A laterally directed opening or passageway 157 extends outwardly from said bore 152, intermediate the threaded portions of said bore and preferably just above said removable seat 156. The outer end of said opening 157 is threaded to receive a thimble 158 having an axial bore therethrough for connecting a pipe 159 to said opening. Thus, it will be seen that a passageway from said pipe 142 to said pipe 159 is provided through said valve body 151.

The thimble 153 at the upper end of said bore 152 is provided with an axial bore 160, the lower portion of which is counterbored at 161 and a small, cylindrical valve 162 is positioned within said counterbore 161. The lower end of the valve 162 is pointed, so as to engage and seat upon said removable valve seat 156 for closing the passageway through said valve body 151, whereby the flow of fluid from said pipe 142 to said pipe 159 through said valve body may be controlled. It is pointed out that this valve member 162 may undergo a limited sliding movement within the counterbore 161.

A thin valve rod or stem 163 extends downwardly through the bore 160 of said thimble 153 and the lower end of said valve stem rests upon the upper end of said valve member 162, but has no fixed connection therewith. Manifestly, when said valve stem is moved downwardly, its lower end engaging the upper end of said valve member will move said valve member downwardly, so that the conical point on its lower end engages in the removable seat 156 and closes said passageway through said valve body 151. So long as the stem 163 is held in its lowermost position, it will hold said valve member in a seated position which positively prevents a flow of fluid from said pipe 142 to said pipe 159. However, when the pressure on the upper end of said valve stem is released or removed, the pressure of said fluid in said pipe 142 and said bore 155 of said thimble 154 acting against the underside of said valve member 162 will move said member and said valve stem upwardly in said counterbore 161 and said bore 160 respectively. It is pointed out that the upward movement of said valve member will be limited by the upper end of said member striking the shoulder between said counterbore 161 and said bore 160, and as the upward movement of said valve member ceases, the upward movement of said valve stem will also be terminated.

For controlling the operation of said valve stem 163, to regulate the seating and unseating of said valve member 162, said valve stem has its upper end contacting the underside of a knurled head of an adjustable stop bolt 164, but has no fixed connection therewith. This bolt is threaded into the underside of a lever 165, which lever has one end curved downwardly and pivoted to said valve body 151, so that said lever extends upwardly from one corner of said valve body and overhangs the same. In Figure 7, it will be seen that due to its pivotal mounting said lever 165 tends to swing downwardly at all times and is supported only by said valve stem 163, whereby the weight of said lever is imposed upon said valve stem and said valve member 162 to hold said member in its seated position. In order for said valve member to raise said lever 165, the pressure of the fluid below said valve member must be sufficient to lift said lever and its attachments; although, it is true that said valve member and said stem exert the lifting action of the pressure fluid at a spaced point from the pivot point of said lever and which spacing to some extent facilitates the lifting of said lever.

An operating crank or finger 166 is pivoted at one end to an ear or lug 167 depending from the underside of said lever 165. The outer end of said finger 166 is upturned and slotted to form a bifurcated yoke in which a small roller 168 is so mounted that it is free to revolve therein. It will be seen in Figures 4 and 7, that the roller 168 rides on the periphery of a suitable escapement or revolvable wheel 169, that has one or more notches 170 cut or formed in its periphery. This escapement wheel is mounted on a shaft 171 extending from a suitable housing 172 containing a time or clock mechanism (not shown) for driving said shaft 171 and said wheel 169. This wheel 169 revolves in a counter-clockwise direction (Figures 4 and 7) and said roller 168 rides on the periphery of said wheel, so that when said wheel has revolved and a notch 170 has come over said roller 168, said roller is free to enter said notch, as will be described later.

The outer end of said lever 165 is provided with a depending bolt or pin 173 which extends through a slot (not shown) in said finger 166 and the lower end of said pin 173 is threaded to receive a knurled nut 174. A small, coiled spring 175 is mounted between said nut 174 and the underside of said finger 166, so as to exert a lifting action on said finger and the tension of said spring 175 may be regulated by said knurled nut 174, whereby said finger 166 and said lever 165 are so connected together as to co-act and form a flexible connection from the roller 168 to the upper end of said valve stem 163. The flexibility or rigidity of this connection, thus formed, may be regulated by the tension placed on said spring 175 by said knurled nut 174, thereby, when one of the notches 170 is above said roller 168, said pressure fluid beneath said valve member 162 will lift said valve member, said stem 163, said lever 165, said finger 166 and said roller; until said roller engages the bottom of said notch, which terminates the upward movement or travel thereof.

It is pointed out that said valve C is actuated at a lower pressure than said valve B is actuated (Figure 5), so that when the valve 162 is opened, the pressure fluid from said pipe 159 entering said caps 177 and 181 will move said piston rod 145 downwardly to close said port 441 before said piston rod 121' is moved downwardly to open said port 141'. The pressure fluid from said passageway 79 may now flow through said passageway 81 and into said pipe 83. The clock valve D regulates the entire actuation of said valves B and C which makes them completely time operated valves. The regulating mechanism of said clock valve D is the knurled bolt 164 and its lock nut 164' threaded through said lever 165.

The finger 166 has a short, upstanding lug 400 on its upper surface near said pin 173 and spaced from said lug 167 for engaging the undersurface of said lever 165. Attention is directed to Figure 7, wherein it will be seen that there is a small space between the upper end of said lug 400 and the underside of said lever. The amount of space between said lug and said lever is regulated by said bolt 164 and this space, together with the adjustment of said bolt 164, control the length of time said valve 162 remains open, as well as the length of time said valves B and C are actuated and then released. Whenever the adjustments of said regulator valve A are changed, so that a greater or lesser pressure is carried in said passageway 79, said bore 132, said chamber 114' and said pipe 142, said bolt 174 and said spring 175 have to be adjusted in accordance to regulate the tension of said roller 168 on said wheel 169. This bolt 174 and spring 175 take care of any slight inaccuracies or irregularities in said wheel 169, in said shaft 171, or in the timing mechanism (not shown) driving said shaft.

The adjustment of said bolt 164 and the amount of space between said lug 400 and said lever 165 control the depth to which said roller 168 enters said notch 170 in said timing or escapement wheel 169 before said lug engages said lever to lift the same. As soon as said lug engages said lever, the pressure fluid beneath said valve 162 will lift said valve, said lever and said roller, whereby the pressure fluid will flow through said pipe 159 to said release valve C and said motor valve B. When said roller has entered said notch to the point where said lug 400 engages said lever 165, the opening of said valve 162 begins and this valve will remain open while said roller completes its entrance into said notch until the bottom of said notch is reached. Due to the revolving of said wheel 169, said roller will ride on the inclined side of said notch and be carried up and out of said notch. As soon as said roller reaches the point where said lug 400 engaged said lever 165 and said valve 162 was opened, said valve 162 will be closed and said lug will drop away from said lever. If said roller is not out of said notch when this point is reached, said roller will continue riding up the inclined surface of said notch until it reaches the periphery of said wheel.

The valves B and C are actuated to move their respective piston rods downwardly when said valve 162 is opened and are held in this position as long as said valve 162 is open. Thus, by regulating the length of time said valve 162 is open, the opening and closing of said valves B and C will be controlled. The length of time said valve 162 is open depends on the depth that said roller enters said notch before said valve is opened, because said valve is closed when said roller reaches the same depth at which it opened said valve. By adjusting said bolt 164 to increase or decrease the space between said lug 400 and said lever 165, the depth to which said roller enters said notch is easily regulated and the length of time said piston rods 121' and 145 of said motor valve B and said release valve C respectively are held in their lowermost positions.

When said valve 162 has been closed, the pressure fluid trapped in said caps 177 and 178, said pipe 180, said T 176 and said pipe 159 will leak or bleed around said valve stem 163 and through said bore 160 and escape to the atmosphere. This bleeding will permit said piston rods 121' and 145 to be lifted by said springs 126' and 179 respectively. Due to the different tensions placed on said springs, said piston rod 121' of said motor valve B will move upwardly first and close said port 141' and then said piston rod 145 of said release valve C will move upwardly and open said port 441. When this occurs, the pressure fluid trapped in said passageway 81, said pipe 83, said cylinder 84 beneath said piston 101, said pipe 183 and in said lubricator housing 185 beneath said piston 192 will be vented through said port 441, said passageway 144, said passageway 147 and said short pipe 148 to the atmosphere.

As has already been pointed out (Figures 4, 5 and 6), said passageway 79, said port 78, said bore 132, said cap 114, said pipe 142 and said bore 155 of said thimble 154 will be filled with a predetermined pressure that is regulated by the tension placed on said spring 126 by said nuts 124 on said posts 108 and 108'. When the clock mechanism (not shown) in said housing 172 drives said shaft 171 for revolving said wheel 169 in a counter-clockwise direction and one of said notches 170 comes over said roller 168, the pressure in said bore 155 of said thimble 154 beneath said valve member 162 may then lift said valve member, said valve stem 163 and said lever 165, so that said roller will enter said notch. Thus, it will be seen that in this position, pressure fluid in said pipe 142 is then free to flow into said pipe 159 which leads to said T 176 connected into the cap 177 of said valve C. This pressure fluid will enter said cap 177 and act on said diaphragm 178 and move said valve stem 145 downwardly against the tension of said coil spring 179, so as to seat said conical point 146 in said seat 146' on the upper end of said bore 441 and close the same. This pressure fluid will also flow from said T 176 into a pipe 180 leading from said T to the cap 181 of said valve B. The diaphragm 182 of this valve will be acted upon by the pressure fluid entering said cap 181 and move said stem 121' downwardly which opens said passageway 141', whereby pressure fluid may now flow from said longitudinal passageway 79, through said port 141', into said port 80 and through said longitudinal passageway 81. The valve tip 146 of said stem 145 has already engaged its seat 146', which is the closed position of said valve C, and said pressure fluid will flow downwardly from the end of said passageway 81 through the lower end of said port 82 and into said pipe 83 through which it is led to the lower end of said cylinder 84 beneath said piston 101.

When said pressure fluid flows from said passageway 79 into said passageway 81, the pressure in said chamber 114' of said cap 114 will be reduced by way of flow through said bore 132 of said stem 121 unseating said conical tip 135. Additional pressure fluid will then flow from said pipe 70 and maintain the pre-determined pressure desired in said cap 114, said passageway 79, said passageway 81, said pipe 83 and cylinder 84, as well as in said pipe 142, said pipe 159, said pipe 180 and said caps 177 and 181. Of course, said piston 101 will be lifted in said cylinder 84 and will carry said piston rod 97 and said clamp 103 therewith.

Figure 2:
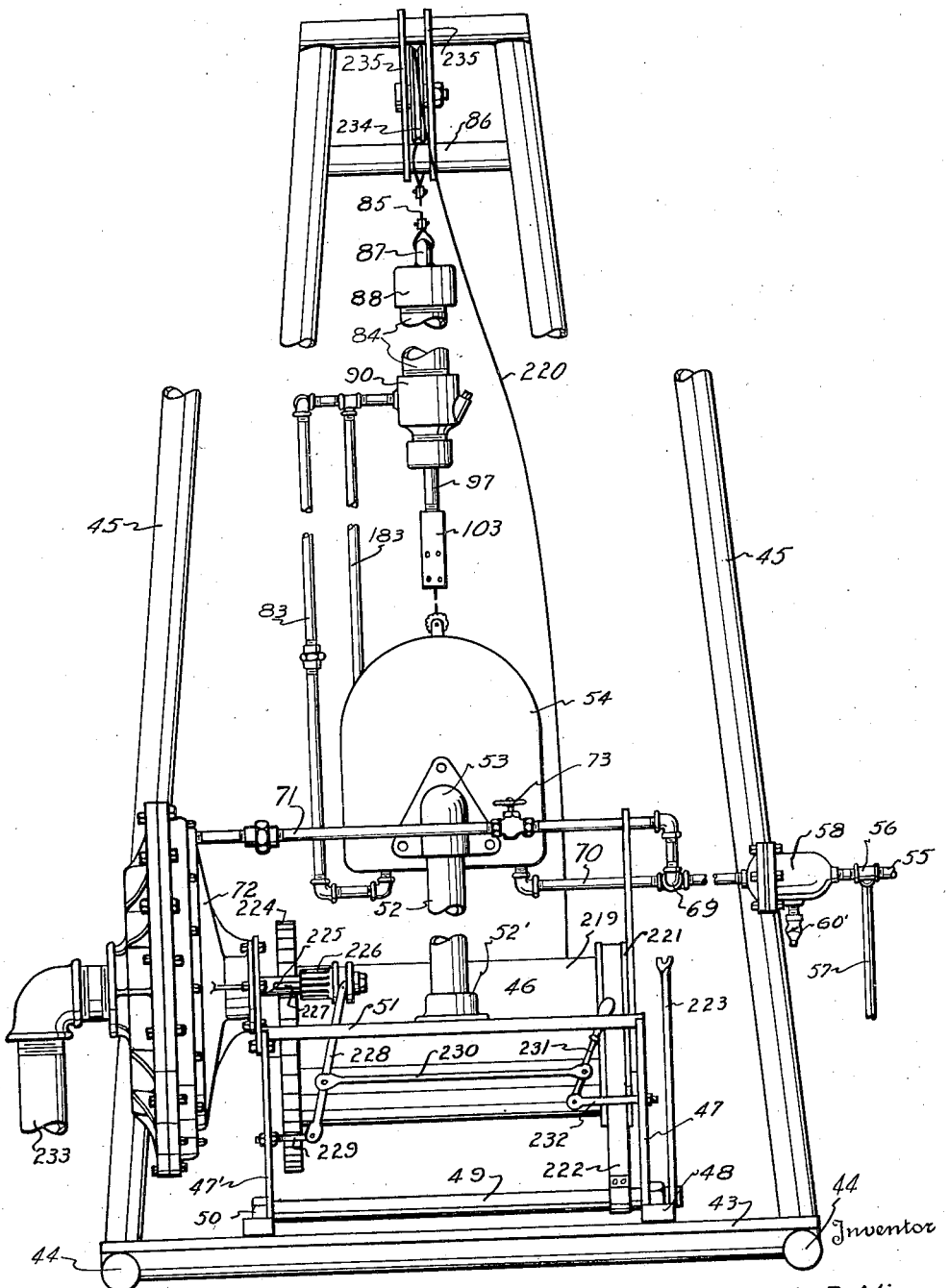
Figure 2 is an end view taken at right angles to Figure 1.
Figure 3:
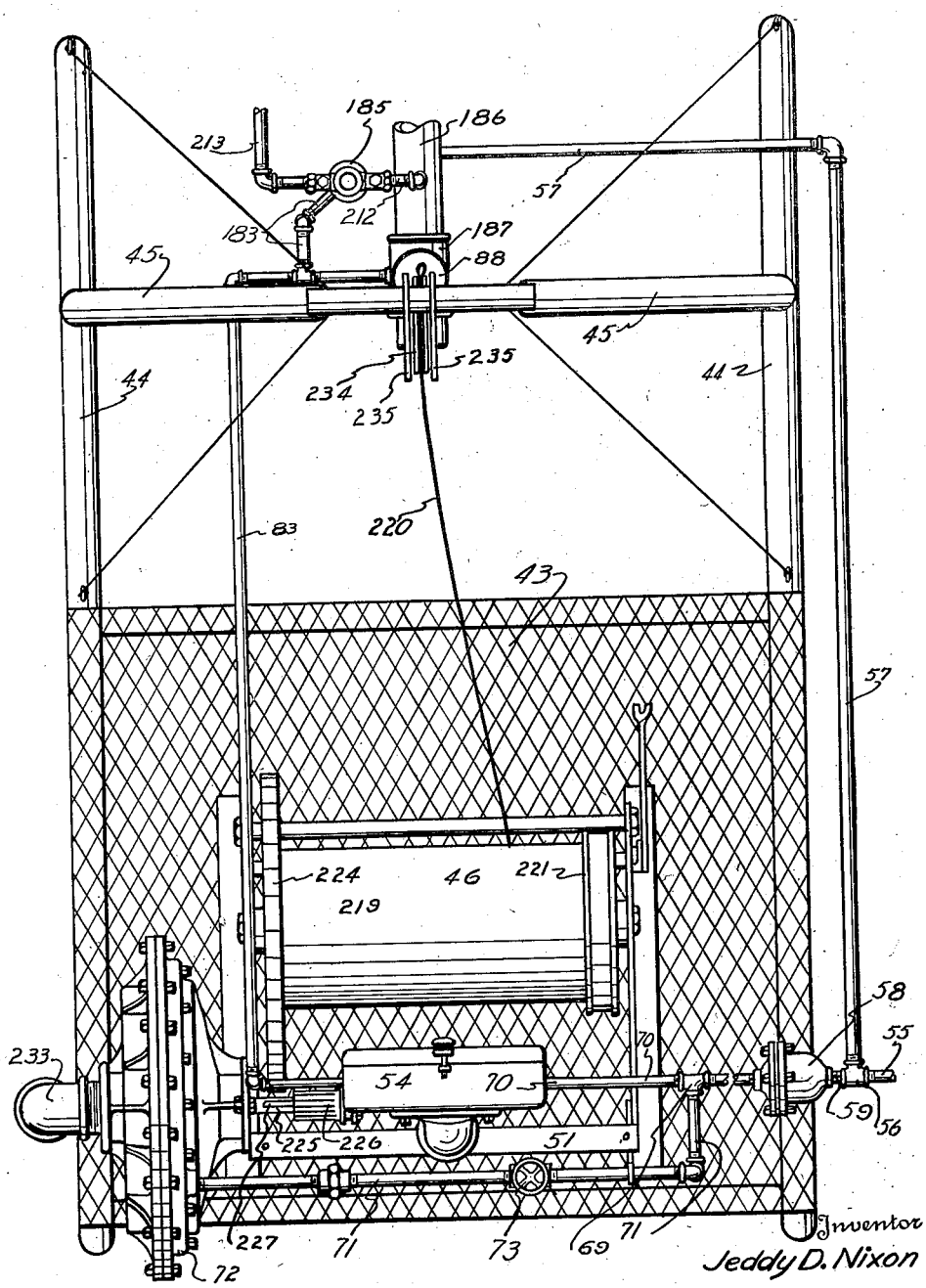
Figure 3 is a plan view of the above-ground structure.

It will be seen in Figures 1, 2 and 3, that a pipe 183 is connected to said pipe 83, preferably adjacent said cylinder 84, and this pipe leads to an elongate lubricator or fluid injector housing or body 185. This lubricator is connected into the usual well fluid flow line 186 which extends from the regular cross T connection 187 mounted upon the upper end of said tubing string 41 for injecting a suitable fluid into said flow line for treating or mixing with said well fluid flowing therethrough from said tubing string, such as a chemical for treating emulsions.

A slidable, reciprocating piston rod 188 is mounted in the lower portion of said lubricator housing 185 and this piston rod 188 has its lower end reduced, so as to form a depending pin 189 on which is mounted an annular, flat washer or ring 190 and the upper edge surface of this ring abuts the shoulder formed between said pin 189 and said piston rod 188 (Figure 33). A suitable spacer and supporting ring or collar 191 is mounted on said pin 189 below and adjacent to said washer 190, so that a suitable downturned piston cup or ring 192 may be clamped between said washer 190 and said collar 191 and make a unitary structure of said parts. The lower end of said pin 189 is screw-threaded for receiving a nut 193 which bears against the under surface of said collar 191 and when said nut is tightened said washer 190, said collar and said piston cup 192 are securely attached to the lower end of said piston rod 188 on said pin 189.

The upper end of said piston rod 188 is also formed with a reduced pin 194 similar to said pin 189, although much smaller in diameter. This pin 194 has a suitable spacer collar or ring 195 similar to said collar 191 for supporting a downturned packing cup 196 similar to said cup 192. A flat washer or ring 197 similar to said washer 190 is mounted on said pin above said packing cup 196 and resting upon said washer 197 is an upturned packing cup 198 similar to said cups 192 and 196. The upper end of said pin 194 is screw-threaded to receive a nut 199 to clamp said piston cups 196 and 198, said washer 197 and said supporting collar 195 onto said reduced pin 194 against the shoulder formed between said pin 194 and said piston rod 188. It will be seen in Figure 33, that the upper end of said piston rod 188 and said piston structure just described reciprocates within a cylindrical sleeve 200 which forms a cylinder for said piston structure. The lower end of said sleeve 200 is provided with a radial flange 201 which may be clamped in a groove 202, in order to attach said sleeve 200 to said housing 185 and to hold said sleeve stationary. A suitable coiled spring 203 is mounted on said piston rod 188 between the flange 201 of said sleeve 200 and said washer 190 of said lower piston structure, so that said piston rod 188 and its piston structures on each end move upwardly within said housing 185 against the tension of said spring 203.

Whenever pressure fluid flows through said pipe 83 into the lower end of said cylinder 84 to lift said wire line clamp 103, this pressure fluid will also flow through said pipe 183 into the lower end of said lubricator housing 185 beneath said piston on the lower end of said piston rod 188. As the pressure builds up within said pipe 83, cylinder 84, pipe 183 and in the lower end of said housing 185; said piston rod 188 will be moved upwardly against the tension of said spring 203, so that when said pressure fluid is bled or vented from said pipe 183, said cylinder 84 and said pipe 83, said spring will return said piston rod to its lowermost position. A pair of suitable air holes or vents 204 are provided in said housing 185 at a point above the travel of said lower piston, so that upon the upstroke said piston does not have to compress the air trapped thereabove, or upon its downstroke pull a vacuum.

It will be seen in Figures 33, 34 and 35, that the cylinder sleeve 200 is spaced from the inner wall of said housing 185, so as to provide an annular space between said sleeve and the inner wall of said housing and around said sleeve. A pair of lugs or ears 205 and 206 are threaded into said housing 185, preferably diametrically opposite each other and below the upper end of said sleeve 200. The ear 205 is formed with a longitudinal passageway 207 and the outer end of said passageway terminates in an internally screw-threaded port 208 for receiving a pipe 209 that leads to a suitable source of fluid supply (not shown). A suitable check valve 210 is mounted in said longitudinal passageway 207, so that fluid may flow from said pipe 209 into said passageway 207 and the annular space between said sleeve 200 and said housing 185, but backward flow from said annular space is prevented. Thus, said annular space and said sleeve 200 above the piston on the upper end of said rod 188 will be filled with the fluid from said pipe 209.

The ear 206 also is provided with a longitudinal passageway 211, similar to said passageway 207 of said ear 205, terminating in a threaded port 212 for receiving a pipe 213 which leads to said flow line 186. This passageway 211 is also provided with a check valve 214 which permits flow of fluid from said annular space through said passageway 211 and into said pipe 213 for delivery to said flow line 186. Thus, upon each upward stroke or travel of said piston rod 188, the fluid within said sleeve 200 above said upper piston will be expelled therefrom and due to the checking action of said check valve 210 this fluid will be forced through said passageway 211, past said check valve 214, into said pipe 213 and injected into said flow line 186. Then, upon each downstroke or travel of said piston rod, said upper piston will have a tendency to draw fluid from a suitable source (not shown) through said pipe 209, past said check valve 210 and due to the action of said check valve 214, no fluid will be drawn from said pipe 213 and said passageway 211.

The upper end of said housing 185 is provided with an adjustable stop or regulating pin or bolt 215 which is threaded therethrough and according to the amount of bolt 215 projecting below the upper end of said housing, the length or the stroke of upward travel of said piston rod may be regulated; whereby the desired amount or quantity of fluid injected into said flow line 186 may be controlled. An upstanding, concentric, externally threaded boss or stud 216 surrounding said bolt 215 is provided, in order that a protecting cap or bonnet 218 may be mounted on said boss to protect said bolt and prevent the accidental changing of the adjustment of said bolt 215, as well as forming a fluid-tight cover therearound in case fluid should leak or be forced along the threads of said bolt and the waste of fluid occur.

The hoist 46 is provided with a wire line or cable drum 219 on which said wire line or operating cable 220 is spooled. One end of said drum is provided with a suitable brake drum 221 on which a brake band 222 rides and this band is operated by the usual brake lever 223. The other end of said drum is provided with a suitable large driving gear 224. The pressure fluid driven turbine (not shown) within said housing 72 drives a shaft 225 extending from one side of said housing and this shaft has a spur gear 226 slidably mounted on said shaft by a suitable key 227. The usual free riding, yoke arm 228 is rotatably mounted on said spur gear 226 for sliding the same on said shaft 225 to mesh and disengage said spur gear with said driving gear 224. The lower end of said yoke arm 228 is pivotally mounted to one end of a horizontally extending bolt 229 mounted on said end plate 47'. A pitman 230 has one end pivotally connected to said yoke arm 228 intermediate its ends and the other end of said pitman is pivotally connected to a swinging handle 231 that is pivotally mounted on one end of a horizontally extending bolt 232 which is attached to said end plate 47. Thus, it will be seen in Figure 2 that by swinging said handle 231, said spur gear 226 may be slid on said shaft 225 into mesh with said driving gear 224 or may be disengaged from said gear. A suitable outlet or exhaust pipe 233 is connected to the other side of said housing 72 from said shaft 225, which exhaust pipe may be vented to the atmosphere, or led to a suitable tank for a closed system, or a suitable disposal as desired.

By operating said throttle valve 73, the starting and stopping, as well as the speed and power of said pressure fluid turbine (not shown) within said housing 72 may be regulated, as desired. An operator may stand on said platform 42 to the right of said hoist 46 (Figures 2 and 3) and have said throttle valve 73, said swinging handle 231 and said brake lever 223 all within easy reach for complete control of said turbine (not shown) and said wire line drum 219, whereby the operator may spool or remove said wire line 220, as desired. This wire line preferably extends from said drum up over a sheave 234 of a sheave block 235 mounted at the upper end of said stub derrick 45. This wire line then extends down into said tubing string 41 to an elongate weight bar 236, or other suitable operating mechanism in said tubing string. It is pointed out in Figures 1, 15 and 23, that said wire line extends through a stuffing box 237 mounted upon the usual cross connection 187 upon the upper end of said tubing string 41.

This stuffing box 237 is of the duplex or double packing type and consists of a lower body or section 238 and an upper section or body 239. The lower section being elongated and cylindrical has an axial bore 240 extending therethrough and the major portion of said bore is counterbored to form a packing chamber 241 therein in which a suitable packing collar or material 242 is placed to surround and seal around said wire line 220. The lower end of said section 238 is provided with external screw-threads 243 for engaging in the upper end of said cross connection 187 and the upper end of said section 238 is also provided with external screw-threads 244 for receiving a clamping or hold-down nut 245. The upper portion of said counterbore 241 is additionally counterbored so as to form an enlarged bore 246 for receiving the lower end of said upper section 239.

It will be seen in Figures 23 and 25, that said upper section 239 is provided intermediate its ends with an annular external rib or flange 247 for abutting the upper edge of said lower section 238 and limiting the telescoping of said upper section into said lower section 238. The upper portion of said hold-down nut 245 has a lip 248 for overhanging said flange 247, so as to clamp said upper section to said lower section. A packing or sealing ring or gasket 249 is placed in the bottom of said enlarged bore 246 below the lower end of said upper section, so as to form a fluid-tight seal between said upper and lower sections and prevent the escape of fluid therefrom when said sections are securely clamped together by the tightening of said hold-down nut 245. Said upper section is provided with an axial bore 250 which is preferably larger than said bore 240 of said lower section. The upper portion of said bore 250 of said upper section is counterbored to form an elongated packing chamber 251 and in the lower portion of said packing chamber is seated an annular packing gland or junk ring 252 upon which rests suitable packing or sealing material 253 which may or may not be the same as said packing 242. A suitable packing gland or follower block 254 is fitted within the upper end of said packing chamber 251 for compressing and expanding said packing 253 into sealing around said wire line 220 whenever pressure is applied to said follower block 254.

The upper portion of said upper section 239 is reduced and provided with external screw-threads 255 for receiving an elongate, cylindrical cap or nut 256. The upper end of said cap hangs or engages above an external annular rib or flange 257 formed near the upper end of said follower block 254, so that when said nut 256 is screwed downward on the threads 255 of said upper section, the follower block 254 will be forced downwardly upon said packing 253 and tighten the same around said wire line 220, whereby a seal or pack-off around said wire line is provided at this point and any fluid carried upwardly by said wire line or flowing along said wire line will be stripped therefrom and leakage prevented. As said packing 253 wears, said cap 256 is given additional turns on said threads 255 to tighten said packing and this is continued until the lower surface or edge of said flange 257 engages the upper end of said upper section 239. When this occurs it is then necessary to back off and remove said cap 256, as well as the follower block 254 and additional packing added in said packing chamber 251, in order that said follower block 254 and said cap 256 may again be tightened against said packing 253 to seal around said wire line 220. However, before said cap 256 can be loosened preparatory to removal thereof and the addition of more packing, said packing 242 in said lower section 238 has to be brought into sealing position so that fluid may not escape from said tubing through said stuffing box during this removal operation.

It will be seen in Figure 23, that said packing 242 has an annular follower block or packing gland 260 placed thereupon which gland has a longitudinal channel or groove 261 extending the major portion of its length. A stud pin or locking bolt 262 is threaded into said lower section 238 and the inner end of said bolt is provided with a reduced pin or tit 263 for engaging in said longitudinal groove 261 and preventing the rotation of said packing gland 260. The lower portion of said bore 250 of said upper section is provided with a counterbore 264 and the lower portion of this counterbore is formed with internal screw-threads 265. The upper portion of said packing gland 260 is provided with external screw-threads 266 for engaging with said screw-threads 265 of said upper section. Thus, it is pointed out that upon the rotation of said upper section 239, said packing gland will be forced upwardly or downwardly depending upon the direction of rotation of said upper section due to the engaging of said threads 265 and 266, while said pin 263 engaging in said groove 261 prevents said gland 260 from rotating with said upper section. The bolt 262 serves an additional purpose which is the limiting of the rotation of said hold-down nut 245 because of a depending lug or finger 268 on the lower edge of said nut engaging one side or the other of said bolt 262, depending upon the direction of rotation. The upper end of said nut 245 is provided with radially extending ears 269 to assist in the rotation of said hold-down nut 245. A pair of flat wrench faces 270 may be provided on said upper section below said reduced portion and above the upper surface of said hold-down nut 245 to assist in the rotation of said upper section.

When said upper and lower sections are assembled, said hold-down nut is tightened on said threads 244 of said lower section 248 to clamp said upper and lower sections together, then said bolt 262 is inserted and threaded into its opening so that said pin 263 may engage in said groove 261 of said packing gland 260. The packing 242 in the chamber 241 is not compressed at this time, since the purpose of this packing is to serve as an auxiliary seal-off only while said packing 253 in said packing chamber 251 of said upper section is being replaced.

When it becomes necessary to replace said packing 253, said hold-down nut 245 is backed off until said lug 268 engages said bolt 262 and this is usually from three-fourths to one-half or one-third of a revolution of said nut. This backing up of said nut 245 is sufficient to loosen the clamping action of said overhanging lip 248 on said flange 247, whereby said upper section may be rotated to move said packing gland 260 downwardly and compress said packing 242 in said chamber 241 into sealing engagement with said wire line 220. The cap 256 and follower block 254 may now be removed and additional packing placed upon said packing 253, at which time said follower block 254 and cap 256 may again be lowered and tightened against said packing, until the same is in sealing engagement with said wire line 220. At that time said upper section may be rotated in the opposite direction in which it was rotated to tighten said gland 260, until all pressure of said gland 260 on said packing 242 is removed, at which time said hold-down nut 245 may again be tightened and clamp said upper and lower sections together. Thus, it will be seen that said packing 253 may be used to seal around said wire line 220 and may be replaced easily and conveniently without any danger of leakage.

The cap 256 is formed with an upturned annular flange or rim 271 so that a shallow reservoir or recess 272 is formed on the upper end of said cap. The upper end of the axial bore of said follower block 254 is countersunk so that a lubricating fluid may be placed in said recess or reservoir 272 and flow down and around said wire line 220 in said axial bore of said follower block, whereby said wire line may be lubricated through said packing 253 without undue friction therebetween.

Attention is called to Figures 15 to 22 and 31, wherein it will be seen that said weight bar 236 on the lower end of said wire line 220 is divided into two parts or sections, and the upper part 273 comprises the weight portion and the lower section 274 is the actuating section. Said upper section 273 is preferably somewhat smaller in diameter than said lower section 274, and said lower section is preferably a third to one-sixth or one-eighth as long as said upper section. The reason for said upper section being reduced in diameter is that less surface is presented to the fluid flowing upwardly through said tubing string 41 and less friction between said moving column of fluid and said weight bar will be had, so that any tendency of said moving column of fluid to exert a lifting action on said weight bar is prevented.

As pointed out in my above-mentioned patents and copending applications, the tubing string 41 is provided with any desired number of flow or kick-off valves (not shown) in order to lower the well fluid level in said casing string 40 and said tubing string 41 down to the point or level at which it is desired to operate or produce the well. Ordinarily, one of the kick-off valves or a slightly modified form of one of the above kick-off valves is used as a producing or operating valve, but in some wells it becomes necessary to produce said well fluid at a point below the end of said casing string 40, or in a liner 275 mounted in the lower end of said casing string 40, or below perforations in the lower portion of said casing string or in said liner 275, and when such a condition occurs my usual kick-off valve may not be used at this point. Therefore, it is necessary to set a packer 276, preferably of my own construction such as shown in my Patent No. 2,171,479, although any desired packer may be used. It is preferred to mount said packer 276 in said tubing string 41 and to set said packer as low in said casing string 40 as is possible, in accordance with said position of said liner 275 or of the above-mentioned perforations (not shown).

An elongated, cylindrical valve 277 is mounted in said tubing string just above said packer 276 and while at first glance this valve seems to differ somewhat from my usual kick-off valve, its basic principle of action is the same. The upper end of said valve 277 is provided with a cylindrical cap 278 having an internally screw-threaded box 279 on its upper end for receiving an external screw-threaded pin 280 of said tubing string 41 for connecting said valve into said tubing. The lower end of said cap 278 is provided with a box 281 similar to said box 279 for engaging an upstanding, externally screw-threaded pin 282 on the upper end of said valve body or head 283. The lower portion of said body is provided with external screw-threads 284 for receiving an internally screw-threaded box 285 upon the upper end of an elongated, cylindrical sleeve 286 and this sleeve has a similar box 287 on its lower end for receiving one end of an externally screw-threaded cross plug, tail body, or tail piece 288 and threaded onto the lower portion of said cross plug 288 is a collar 289 having an internally screw-threaded box 290 on its lower end for receiving the threaded pin 291 of said tubing 41. A relatively soft metal packing ring 292 is inserted between the upper end of said body 283 and the lower end of said collar 278, and between the lower end of said body and the upper end of said sleeve 286, and between the lower end of said sleeve and the upper end of said collar 289 for sealing said joints and connections for preventing leakage at said connections. Thus, it will be seen that said valve 277 may be readily connected in said tubing string.

The valve body or head 283 is provided with an internal, cylindrical chamber 294. A plurality of radial, internally screw-threaded ports 296 extend outwardly through the walls of said valve body and provide communication between the annular space within said casing 40 and said tubing string 41 through said chamber 294. When said ports are open (Figures 19 and 21), pressure fluid may enter said tubing from said annular space of said casing. It is preferred to locate said ports in an equidistantly spaced relation around said chamber and all in the same horizontal plane. However, while this valve has been shown and described with three ports, one or more may be used as desired. In some instances where a great number of ports are provided, said body 283 will be elongated and the ports formed in groups and each group would be on a horizontal plane.

Each port is provided with a valve cage or insert unit 298 threaded thereinto and having a co-axial passageway 299 extending through each valve cage. The inner end of each passageway 299 is formed with a ground tapered seat 300, so that a ball valve 301 may be mounted in the passageway of each valve cage 298 for engaging the seat 300 and closing said passageway, whereby each of said ports will be closed. The outer end of each passageway is internally screw-threaded, so as to receive a perforated button or cap 302.

Whenever pressure fluid is introduced into said annular space of said casing string and flows through said passageways 299 and encounters said balls 301 in said open ports, the passage of said pressure fluid through said open ports will carry said balls onto their respective seats 300, thereby closing said open ports as well as shutting off said tubing from said annular space. It will be noticed in Figures 20 and 22, that when said balls are seated so as to close said passageways 299, a portion thereof protrudes into said chamber 294 from said seats 300.

The lower end of said chamber 294 is countersunk, so as to form an enlarged bore 303 for receiving the upper end of a tubular mandrel 304 which has a sliding fit within said bore 303. It will be noticed that a portion of said mandrel 304 is thickened or upset, so that a shoulder 305 is formed to limit the telescoping of the upper end of said mandrel within said bore 303. The lower end of said mandrel is internally screw-threaded, so as to receive a stop or coupling collar 306 which has a reduced depending pin 307 for telescoping within a shallow, annular sump or recess 308 in the upper surface of said cross plug 288. This collar 306 is provided with an axial bore 310 extending therethrough, and the lower end of said sump 308 is provided with one or more ports 311 extending through said cross plug 288 to the lower end thereof, so that a continuous passage is formed from said passageways 299 of said valve cages 298, through said chamber 294, said tubular mandrel 304, said bore 310 of said collar 306, said sump 308, said port 311 and delivered below said plug 288 and inside of said tubing string 41. The lower surface of said plug 288 is provided with a socket or recess 312, that is internally screw-threaded to receive an externally threaded pin 314 on the upper end of a string of auxiliary or tail pipe 313. It is preferred that this tail pipe 313 extend down within said tubing string 41 to within a short distance of the upper end of a standing valve 315 mounted in the lower end of said tubing 41.

The upper end of said socket 312 is provided with one or more longitudinal ports 316 extending therefrom to the upper side of said plug 288, so that a continuous passageway is formed from said tail pipe 313, through said socket 312, said port 316, into said sleeve 286 outside of said tubular mandrel 304, through a plurality of longitudinal passageways 318 extending through said valve body 283, onto the upper side of said valve 277 and within said tubing 41. The upper end of said chamber 294 is countersunk and internally screw-threaded to receive an annular box or guide 319 having an axial bore 320 extending therethrough. The lower portion of said bore is countersunk to form an enlarged bore or chamber 321 and a ground, tapered seat 322 is formed on the shoulder between said bore 320 and said chamber 321.

The upper end of said guide 319 is provided with an externally screw-threaded pin 323 for receiving a coupling member 324 having an internal chamber 325 formed therein and said chamber is provided with a plurality of radial ports or openings 326 to provide communication between said chamber and the inside of said tubing 41. The upper end of said coupling member 324 is provided with a pin 327 similar to said pin 323 and having a bore 328 similar to said bore 320. This pin 327 is externally screw-threaded for receiving the threaded lower end of an upstanding, elongated tube or protector sleeve 329, that preferably extends co-axially within said tubing 41 and is spaced therefrom. The upper end of said sleeve 329 is provided with a plurality of radial ears or lugs 330 for spacing and maintaining the co-axial alinement of said sleeve within said tubing. It will be noticed in Figures 16, 18 and 20, that the lower portion of said weight bar 236 depends within said sleeve 329. When the valve face 343 is off of its seat 322 the free or formation gas from the producing formation flowing up said tubing 41 below said cross plug 288 from said chamber 354, will enter said duct 311 and flow therethrough, into said mandrel 304, through said valve body 283, into said chamber 325 of said coupling 324 and out through said openings 326 into said tubing above said valve. It is pointed out that this free gas is prevented from accumulating in said chamber 354 and restricting the inflow of fluid from said formation. Also, by providing said openings 326 in said chamber 325, said free gas does not enter said protector sleeve 329 nor contact said weight bar 236, nor interfere with the operation thereof.

Figure 19:
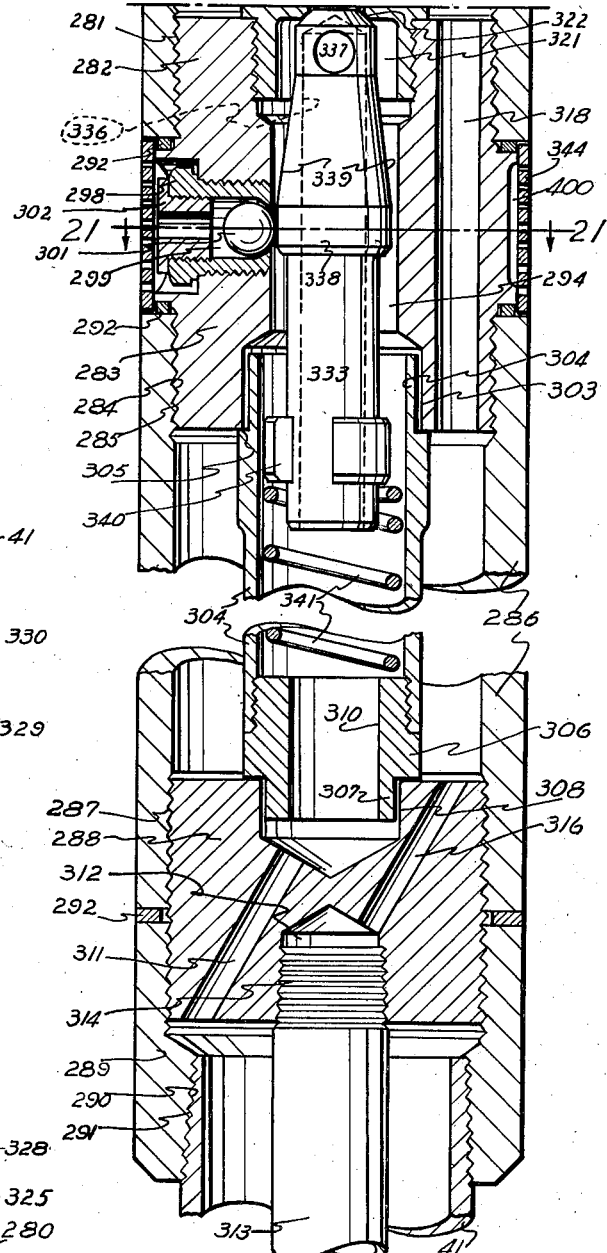
Figure 19 is a similar view showing the lower portion of said valve and is a continuation of Figure 18.
Figure 27:
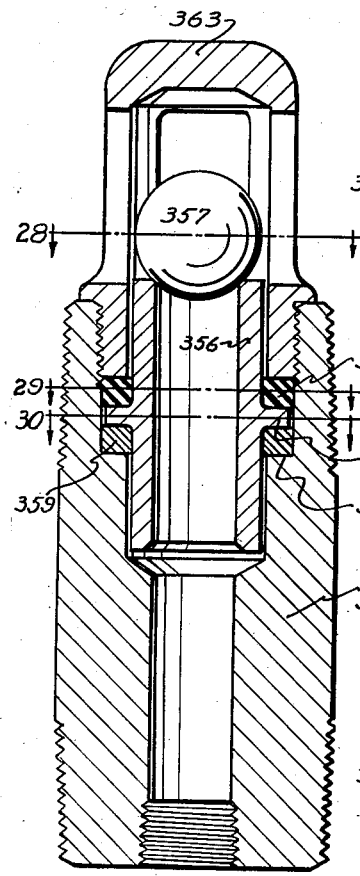
Figure 27 is a longitudinal sectional view of one form of a standing valve that may be used at the foot of the well tubing.
Figure 29:
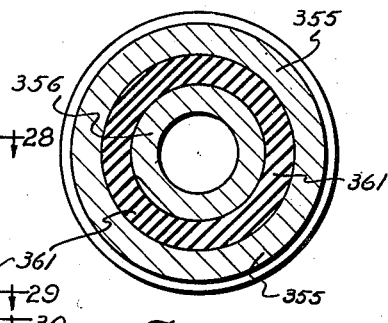
Figure 29 is a similar view taken on the line 29—29 of Figure 27.
Figure 30:
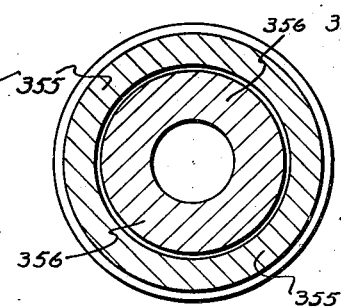
Figure 30 is a horizontal, cross-sectional view taken on the line 30—30 of Figure 27.
Figures 28, 32:
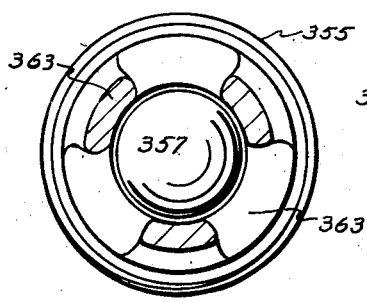
Figure 28 is a horizontal, cross-sectional view taken on the line 28—28 of Figure 27.
Figure 32 is a horizontal, cross-sectional view taken on the line 32—32 of Figure 31.

An elongated, cylindrical dart 333 is mounted in and extends through the lower portion of said sleeve 329, into said bore 328 of said pin 327, through said coupling member 324, into said guide 319, through said chamber 294 and into the upper portion of said tubular mandrel 304. The upper portion of said dart 333 is reduced to form an upstanding, co-axial pin or rod 334 and a flat, annular head 335 is suitably mounted on the upper end of said rod 334, so that the tapered, lower end of said weight bar 236 may readily engage and actuate said rod 334. The lower portion of said dart 333 is provided with an axial bore 336 and the upper end of said bore is provided with a plurality of radial outlet ports 337 extending from said bore to the outer surface of said dart. As will be seen in Figures 19 and 20, a portion of said dart is externally upset or thickened, so as to form an annular boss or actuating member 338 with a tapered guide surface 339 on its upper edge. It will be noticed in Figures 19, 20, 21 and 22, that said guide surface 339 upon the upward travel of said dart will gradually force said balls 301 off their seats 300, until said boss 338 engages and holds said balls in their open position (Figures 19 and 21). Of course, upon the downward travel of said dart 333, the reverse action takes place and said balls are permitted to gradually engage their seats due to the taper of said guide surface 339. The lower end of said dart 333 is provided with a plurality of spaced, short stops or lugs 340 and a suitable coil spring 341 is mounted within said tubular mandrel 304, upon said collar 306, so that its upper end engages said stops 340 and, at all times, said dart is under the tension of said spring 341. The tapered shoulder 343 formed between said lower portion of said dart and said rod 334 engages said seat 322 for limiting the upward travel of said dart and to seal off said chamber 294 from said chamber 325 and the tubing 41 above said valve 277.

Figure 18:
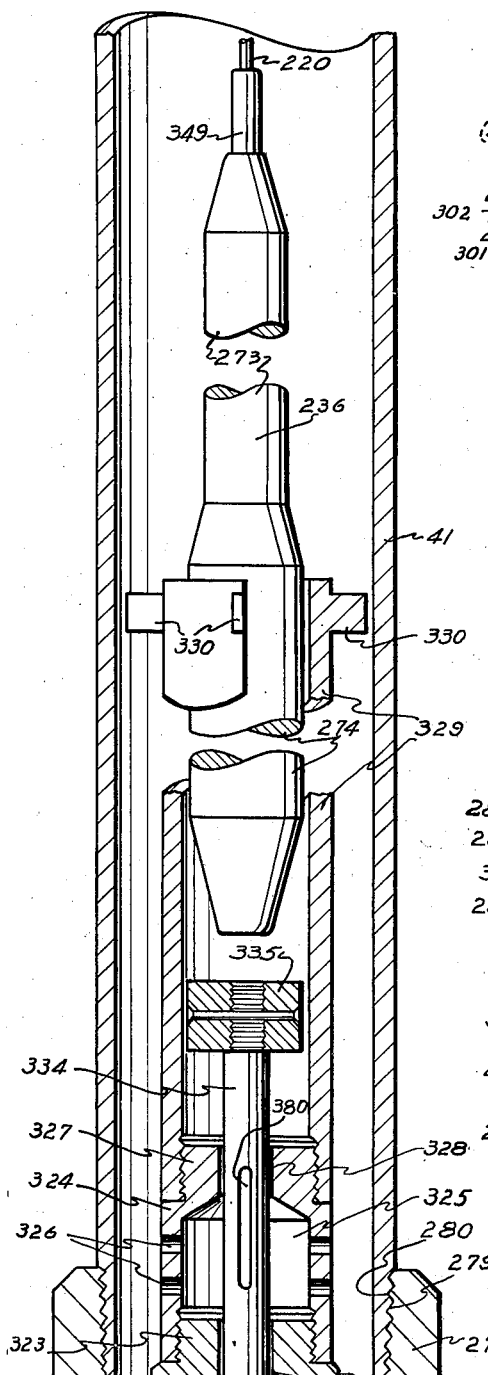
Figure 18 is a view partly in section and partly in elevation of the upper portion of the operating or producing valve in its opened position.

When said valve 277 has been assembled and made up in said tubing string 41, and said well fluid level has been lowered by the production thereof, as taught in my above-mentioned patents and co-pending applications, said weight bar 236 on the lower end of said wire line 220 will be lowered approximately to the position shown in Figures 18 and 19, which is the closed position of said dart 333 in said valve due to the tension of said coil spring 341. When said dart is in this upper position, said balls 301 will be held off their seats 300 so that said pressure fluid in said casing 40 above said valve 277 will force the remaining well fluid in said casing between the lowermost kick-off valve (not shown) and said valve 277, through said passageways 299 of said valve cages 298, into said chamber 294, through said tubular mandrel 304, into said bore 310 of said collar 306, through said passageway 311 of said plug 288 and into said tubing 41 below said plug 288 outside of said tail pipe 313. This admitted well fluid will be forced down said tubing around said tail pipe to the lower end thereof and said pressure fluid from the annular space of said casing will follow the same path of travel. Of course, this well fluid together with the well fluid in said tubing below said valve 277, and the well fluid in said tail pipe 313 and in said valve will be forced or displaced upward into said tubing above said valve and will lift the well fluid in said tubing. This upward path of travel, which will be followed by the pressure fluid too, is through said tail pipe 313, into said socket 312, through said passageway 316, into said sleeve 286 around said tubular mandrel 304, up through said longitudinal passageways 318 and out on top of said valve in said tubing 41 around said sleeve 329. The pressure fluid from said annular space of said casing, following the same path of travel as outlined for said well fluid, will lift said well fluid up said tubing 41 to said cross T 187 and into said flow line 186 where it is led to a separator (not shown), a storage tank (not shown), or any other suitable disposal as desired.

It is pointed out that a perforated band or collar 344 is mounted on said valve body 283 between the lower end of said upper connecting collar 278 and the upper end of said sleeve 286, so as to fully cover the outer ends of said threaded ports 296 to protect the same and prevent any extraneous matter entering said passageways 299 of said valve cage 298 and clogging the same, or said perforated cap 302, or causing damage to said balls 301, or some other mechanism of said valve. Attention is called to Figures 19, 20, 21 and 22, wherein it will be seen that said valve body 283 is formed externally with a shallow, annular channel or recess that extends medially of said body. This channel extends across the open, outer ends of said ports 299 and underlies the perforated collar 344, so that when fluid flows through the perforations of said collar, said channel will receive the same and lead said fluid to said ports.

When said ball valves 301 are being held open by said boss 338 on said dart 333, said tapered shoulder 343 is engaging said seat 322, so that the fluid entering through said passageways 299 will flow down around said dart, as well as into said ports 337, through said bore 336 of said dart, and out the lower end thereof. The pin 334 is provided intermediate its ends with a plurality of elongated, longitudinal, shallow slots or grooves 380. These grooves are so placed on said pin that when said dart 333 is in its upper position (Figures 18 and 19), the lower ends of said grooves are even with or above the upper edge of said pin 323 of said guide 319 and the upper ends of said grooves are below or in the lower portion of said bore 328 of said pin 327. When said dart 333 is in its lower position (Figure 20), the lower ends of said grooves 380 are below said seat 322 on the lower end of said bore 320 and the upper ends of said grooves extend above the upper edge of said bore 320 and into said chamber 325, whereby a passageway is provided from said chamber 321 through said grooves to said chamber 325. This passageway thus formed will prevent the accumulation of free or formation gas in said valve body 283 and in said chamber 321 for two reasons or purposes. First, by venting said gas, said chamber 354 and said tail pipe 313 may fill with well fluid so that upon the next actuation or opening of said valve 277, a full load or charge of well fluid is obtained; second, to prevent the accumulation of formation gas, which would interfere with the operation of said dart.

It is pointed out that the slots 380 are so placed on said stem 334 of said dart 333, as to bleed the free gas from said valve body 283 when said dart is in its lower position. When said dart begins its upward travel to open said ports 299, said slots 380 are closed as soon as their lower ends enter into said bore 320 of said guide 319 and the further escape or bleeding of gas is terminated. At this point of travel, the balance of said stem 334 between said slots and said shoulder 343 serves as a sliding plug in said bore, so that when said balls are pushed open by said guiding surface 339, the pressure fluid entering through the opened ports 299 will assist the spring 341 in lifting said dart 333 to move the same into its upper position, to completely open said ports and seat said shoulder 343. With said protector sleeve 329 preventing the upward flowing column of fluid contacting said weight bar 236 or said head 335 on said stem 334 and any free gas being led outside of said sleeve, the operation or the position of said weight bar is not interfered with and a steady, even actuation of said valve 277 is had. If the protector sleeve were not used, the flowing column of fluids would lift said weight bar and give a reciprocating or fluttering action to said stem with the resultant rapid opening and closing of said inlet ports and a faulty operation of said valve 277. When the ports are closed, the free gas escapes up the well tubing and when said ports are open, said free gas will be carried with the well fluid and the pressure fluid down in said chamber 354 and up said tail or discharge pipe 313 into said tubing 41 above said valve 277. It is pointed out that in initially kicking off the well, the said valve 277 is in its open position so that all the well fluid in said casing 40 flows or is forced therethrough, down into said chamber and up said tail pipe, as has already been described.

Attention is called to the fact that after the well has been kicked off and is being produced and when said flow valve 277 has been opened, the pressure lifting fluid entering said valve flows therethrough and is introduced into the upper end of said chamber 354 onto the upper surface of said well fluid. This well fluid is displaced downwardly in said chamber and up into said tail pipe 313 through said flow valve 277 and into said tubing around said protector sleeve 329. As additional pressure fluid enters said chamber and builds up the pressure therein, said pressure fluid forcing all well fluid ahead of it will follow the same line of flow as said well fluid. Thus, when said pressure fluid reaches the lower end of said tail pipe 313 to exert its lifting force or action on said well fluid in said tail pipe, this column of well fluid is already flowing due to the above set out displacing action. It will be seen that the lifting force of said pressure fluid is delivered to an upwardly moving column of well fluid, whereby there will not be any channelling, cutting, or damaging of said well fluid as there would be if said pressure fluid were introduced down said tail pipe and into said chamber at the lower end of said tail pipe.

Figure 31:
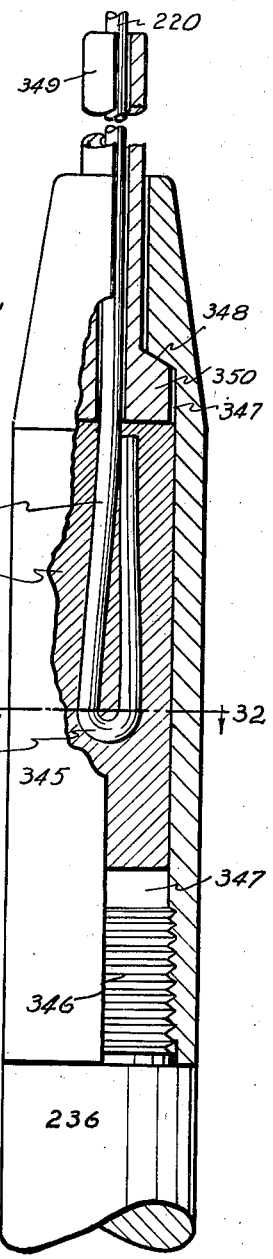
Figure 31 is a view partly in section and partly in elevation of one means of attaching the operating bar to the operating line.

In Figure 31, it will be noticed that in connecting said wire line 220 to said weight bar 236, an elongate, tubular cap 345 is threaded onto a pin 346 on the upper end of said weight bar. The upper portion of said cap 245 is externally tapered, similar to the lower end of said weight bar, so that said bar may readily enter the kick-off valves (not shown) in the upper portion of said tubing string 41. This cap is provided with an axial bore 347 extending therethrough and is reduced at its upper end, so as to form a retaining shoulder or seat 348. An elongated, tubular sleeve or collar 349 has an axial bore slightly larger than said wire line, so that said sleeve may engage or fit over said wire line, and the lower portion of said sleeve extends into the upper end of said axial bore of said cap. The lower end of said sleeve 349 is externally upset so as to form an annular head 350 and the upper edge of said head is tapered in order to match and engage with said retaining shoulder 348, whereby said protecting sleeve 349 may be rotatably locked in said cap. The lower end of said wire line 220 is bent upon itself so as to form a loop 351 and the major portion of said axial bore of said cap 345 below said head 350 is filled with babbitt or other suitable soft metal 352 for securing said cap 345, said sleeve 349, and said loop 351 of said wire line 220 together and holding them in place.

It is pointed out that said protecting sleeve 349 prevents any cutting action on said wire line just above said cap 345 whenever sand or other foreign matter is present in the flowing column of well fluid, because in some instances, due to the tapered construction of the upper end of said cap 345, a moving column of well fluid containing sand would cut or weaken said wire line 220 just above said cap. When such a condition does occur, the use of said sleeve 349 protects said wire line, but it is not essential to the successful operation of my invention and may or may not be used, as is desired. The weight bar 236 is tapered on each end, so as to readily enter any kick-off valves (not shown) that may be mounted in said tubing string above said flow valve 277, as well as to more easily be raised or lowered through any well fluid in said tubing string.

As soon as the lowermost kick-off valve (not shown) has produced the level of well fluid in said casing 40 and said tubing string 41 to that point, the operating portion 274 of said weight bar 236 is lowered out of said kick-off valve (not shown). Said pressure fluid will then begin to force said well fluid through said passageways 299, because said dart 333 will be in its upper position and holding said balls 301 off their seats 300. As has already been pointed out, said well fluid and the pressure fluid therebehind will be delivered from said annular space in said casing through said valve 277 into said tubing 41 below said valve and outside of said tail pipe 313. Of course, all well fluid in said tubing below said valve will be forced down around said tail pipe to its lower end, up through said tail pipe and delivered therefrom through said valve 277 to said tubing above said valve. A short distance below said packer 276, it is preferred to increase the diameter of said tubing string 41 so as to form an enlarged chamber 354 in order that a greater quantity of well fluid may be accumulated to be removed upon each operation of said valve 277. This enlarged chamber 354 extends down to said standing valve 315. This standing valve may be of any suitable structure desired, although it is preferred to use the one which is shown in Figures 27, 28, 29 and 30.

This standing valve consists of the usual tubular nipple 355 which is externally threaded at each end to make for ease in connecting the same in said tubing. The upper portion of the axial bore of said nipple 355 is countersunk, so as to receive a removable and reversible tubular collar or seat member 356 upon which a ball valve 357 rests for opening and closing the passageway or bore of said seat member 356. An external, radially extending flange or rib 358 is formed on said member 256 intermediate its end and preferably centrally thereof. This flange rests upon a soft metal packing or sealing ring 359 such as lead, babbitt or other suitable material, which ring is supported by a shoulder 360 formed in said counterbored portion of said nipple 355. A packing or sealing ring 361 of rubber, rubber compound or any other suitable material, rests upon said flange 368 and the usual retaining cage 363 is screwed down upon said ring 361, so as to place a tension thereon and force said sealing rings 359 and 361 into sealing engagement, whereby fluid will not leak around the outside of said seat member 356. The soft metal packing ring 359 is used beneath said rib 358 to support said seat member 356 and said ball valve 357, because there always will be a greater downward pressure or load on said ball valve and seat member. The softer packing ring 361 receives and is sufficiently compressed by the lower edge of said retaining cage 363 to seal off against low pressures that said metal ring would not hold.

Most wells produce a certain amount of free or formation gas along with the well fluid, which gas usually comes out of solution and accumulates in said casing beneath said packer 276. When this occurs a back pressure is built up beneath said packer to such an extent that the production or incoming of additional fluid into said casing is prevented. To overcome this condition I provide a formation gas valve 360 (Figures 13, 14 and 16) which is rather similar to my other valves and particularly my kick-off valves as mentioned in my co-pending applications and patents.

This formation gas releasing valve is formed with an elongated, cylindrical body having a coaxial, upstanding, externally screw-threaded pin or stud 366 on its upper end and a similar pin 367 on its lower end. A cylindrical collar 361 is provided with an internally screw-threaded box 365 on its end for engaging the threaded pin 366, and a similar box 364 on its upper end for engaging the usual threaded pin (not shown) of said tubing 41 extending above said valve. A similar collar 362 is provided with threaded boxes 368 and 369 for engaging the pin 367 depending from said body 360, and the usual threaded pin (not shown) of said tubing below said valve. Thus, it will be seen that the formation gas valve may be readily mounted in said tubing string. A suitable sealing ring 370 is placed on each pin 366 and 367 of said valve body for receiving the abutting edge of said collars 361 and 362. These rings are preferably of a soft metal, such as brass, but any material suitable for the purpose may be used.

The valve body 360 is formed with an internal, cylindrical chamber or bore with a number of inwardly directed, guide ribs 375 extending thereinto and having their upper and lower ends beveled. One or more radial, internally screw-threaded ports extend outwardly through the walls of said valve body and provide communication between the annular space of said casing 40 and said tubing string 41 when the port is open, so that formation gas may enter said tubing from said annular space of said casing. It is preferred to locate the port in one of the ribs 375 and if more ports are used, all are to be in the same horizontal plane.

This port is provided with a valve cage or insert unit 376 threaded thereinto and a coaxial passageway or bore extends through said valve cage. At the inner end of said passageway of said cage is formed a ground, tapered seat, which has a flat valve member 372 mounted in said passageway for engaging said seat and closing said passageway and said port. This valve member has a valve stem 378 extending outwardly therefrom and through a perforated plug or support 379. This support serves as a guide, as well as a support, for said stem and said valve member. It is pointed out that there is sufficient clearance between the faces of said ribs 375 for said tail pipe 313 to extend through said valve 360 and not interfere with the action of said valve member 372. Also, there is ample passage provided between said ribs for the flow of fluid through said valve around said tail pipe without any restriction.

The action of this formation gas valve 360 is different from my other valves, in that the formation gas in said casing opens said valve member 372 against the tension of the small spring surrounding said valve stem 378. Thus, this formation gas valve acts as a check valve to prevent the accumulation of gas beneath said packer 276, so as not to restrict the inflow of well fluid into said casing.

In wells where there is a deep submergence of said flow valve 277 in well fluid, one of my kick-off valves may be mounted in said tubing string just above said flow valve, so that when said chamber contains too much liquid and the column of well fluid in said tail pipe and said tubing above said valve is too great to lift with the desired operating pressure of said lifting fluid, said weight bar could be picked up to open said kick-off valve (not shown) to admit pressure fluid at this point. This admittance of pressure fluid would cut off said column of well fluid in said tubing and lift this cut off portion or "slug" up and out of said well, as taught in my above-mentioned patents and co-pending applications. As soon as this "slug" of well fluid reaches the surface, said weight bar may again be lowered to close said kick-off valve (not shown). The opening and closing of this kick-off valve may be repeated as often as is necessary. It will be seen that the invention may be modified to accommodate the various producing conditions presented.

Various changes, alterations and modifications may be made in the size, shape and arrangement of the hereindescribed elements, within the scope of the appended claims.

What I claim and desire to secure by Letters Patent is:

1. In a well fluid lifting system of the type described wherein the usual well casing serves as lifting fluid supply and a single string of tubing serves as a well fluid conductor and a valve mounted in the tubing for controlling the admission of lifting fluid into said tubing to lift the well fluid therethrough and an operating member for said valve suspended in said tubing by a wire line which extends up out of said tubing, the combination of, a transportable supporting base having runners to facilitate the handling and supporting of said base, an upright support removably mounted upon said base forming a derrick for the well fluid lifting system, a sheave block mounted at the upper portion of said support for the wire line to extend thereover for ready ingress into or egress from said tubing, a suitably driven hoist mounted on said base near said support for spooling the wire line thereon and controlling the movement thereof to locate and position the operating member with respect to the fluid admitting valve, an actuating cylinder suspended in the support and having fluid pressure operated means therein for connecting to said wire line to control the movement of the operating member after the same has been positioned in the tubing, and a timing mechanism mounted on the base for controlling the supply of pressure fluid to the actuating cylinder to control the movement of the operating member in the tubing, said wire line and operating member being withdrawable from the well and said base and support being readily movable away from the well to provide working space around the well when it is necessary to work on the well.

2. In a well fluid lifting system of the type described wherein the usual well casing serves as lifting fluid supply and a single string of tubing serves as a well fluid conductor and a valve mounted in the tubing for controlling the admission of lifting fluid into said tubing to lift the well fluid therethrough and an operating member for said valve suspended in said tubing by a wire line which extends up out of said tubing, the combination of, a transportable supporting base having runners to facilitate the handling and supporting of said base, a grilled platform on the base for forming a walkway thereon and a support and fastening means, an upright support removably mounted upon said base forming a derrick for the well fluid lifting system, a sheave block mounted at the upper portion of said support for the wire line to extend thereover for ready ingress into or egress from said tubing, a suitably driven hoist mounted on said platform near said support for spooling the wire line thereon and controlling the movement thereof to locate and position the operating member with respect to the fluid admitting valve, an actuating cylinder suspended in the support and having pressure fluid operated means therein for connecting to said wire line to control the movement of the operating member after the same has been positioned in the tubing, and a timing mechanism mounted on the platform for controlling the supply of pressure fluid to the actuating cylinder to control the movement of the operating member in the tubing, said wire line and operating member being withdrawable from the tubing and said base and support being readily movable away from the well to provide working space around the well when it is necessary to work on the well.

3. In a well fluid lifting system of the type described wherein the usual well casing serves as lifting fluid supply and a single string of tubing serves as a well fluid conductor and a valve mounted in the tubing for controlling the admission of lifting fluid into said tubing to lift the well fluid therethrough and an operating member for said valve suspended in said tubing by a wire line which extends up out of said tubing, the combination of, a transportable supporting base having runners to facilitate the handling and supporting of said base, a grilled platform on the base for forming a walkway thereon and a support and fastening means, an upright support removably mounted upon said base forming a derrick for the well fluid lifting system, a sheave block mounted at the upper portion of said support for the wire line to extend thereover for ready ingress into or egress from said tubing, a hoist mounted on said platform near said support for spooling the wire line thereon and controlling the movement thereof to locate and position the operating member with respect to the fluid admitting valve, an actuating cylinder suspended in the support and having pressure fluid operated means therein for connecting to said wire line to control the movement of the operating member after the same has been positioned in the tubing, a timing mechanism mounted on the platform for controlling the supply of pressure fluid to the actuating cylinder to control the movement of the operating member in the tubing, and a pressure fluid turbine mounted on said hoist for operating the same, said wire line and operating member being withdrawable from the tubing and said base and support being readily movable away from the well to provide working space around the well when it is necessary to work on the well.

JEDDY D. NIXON.